(12) United States Patent
Gebers et al.

(10) Patent No.: US 10,616,234 B2
(45) Date of Patent: Apr. 7, 2020

(54) SYSTEM AND METHOD FOR FACILITATING COMMUNICATIONS BETWEEN INMATES AND NON-INMATES

(71) Applicant: INMATE TEXT SERVICE, LLC, Las Vegas, NV (US)

(72) Inventors: Curtis Gebers, Las Vegas, NV (US); Herb Beslanowitch, Las Vegas, NV (US)

(73) Assignee: INMATE TEXT SERVICE, LLC, Las Vegas, NV (US)

( * ) Notice: Subject to any disclaimer, the term of this patent is extended or adjusted under 35 U.S.C. 154(b) by 0 days.

(21) Appl. No.: 16/413,366

(22) Filed: May 15, 2019

(65) Prior Publication Data

US 2019/0268345 A1 Aug. 29, 2019

Related U.S. Application Data

(63) Continuation-in-part of application No. 16/049,375, filed on Jul. 30, 2018, which is a continuation-in-part of application No. 15/926,675, filed on Mar. 20, 2018.

(60) Provisional application No. 62/588,061, filed on Nov. 17, 2017, provisional application No. 62/627,558, filed on Feb. 7, 2018.

(51) Int. Cl.
*H04L 29/06* (2006.01)
*G06F 16/955* (2019.01)
*H04L 12/58* (2006.01)
*G06Q 10/10* (2012.01)
*G06Q 30/04* (2012.01)

(52) U.S. Cl.
CPC ........ *H04L 63/102* (2013.01); *G06F 16/9554* (2019.01); *G06Q 10/107* (2013.01); *G06Q 30/04* (2013.01); *H04L 51/36* (2013.01); *H04L 63/0861* (2013.01); *H04L 63/126* (2013.01)

(58) Field of Classification Search
None
See application file for complete search history.

(56) References Cited

U.S. PATENT DOCUMENTS

| | | |
|---|---|---|
| 6,665,380 B1 | 12/2003 | Cree et al. |
| 9,143,609 B2 | 9/2015 | Hodge |
| 9,426,303 B1 | 8/2016 | Edwards et al. |
| 9,621,714 B2 | 4/2017 | Seyfetdinov |

(Continued)

OTHER PUBLICATIONS

Screen captures from ConnectNetwork GTL, Retrieved from internet: https://web.connectnetwork.com/, Jun. 20, 2018.

(Continued)

*Primary Examiner* — Mazda Sabouri
(74) *Attorney, Agent, or Firm* — Howard & Howard Attorneys PLLC

(57) ABSTRACT

A system and method for verifying the identity of users associated with user profiles for messaging between civilian profiles and inmate profiles includes a database having a plurality of user profiles, an application server having a processor programmed with an algorithm to execute steps to receive a message from a user, the message including a verification ID, hold the message for verification of the user, verify the user via the verification ID, allow a communication with the verified user, and send the verified user to an appropriate list for future messaging.

21 Claims, 28 Drawing Sheets

(56) References Cited

U.S. PATENT DOCUMENTS

| | | | |
|---|---|---|---|
| 9,667,663 B2 | 5/2017 | Hodge et al. | |
| 9,930,171 B1 | 3/2018 | Parampottil | |
| 2001/0036821 A1 | 11/2001 | Gainsboro et al. | |
| 2006/0184544 A1* | 8/2006 | Harper | G06Q 20/382 |
| 2006/0285650 A1 | 12/2006 | Hodge | |
| 2007/0116211 A1 | 5/2007 | Csabai et al. | |
| 2009/0207987 A1 | 8/2009 | Ryan | |
| 2010/0189228 A1 | 7/2010 | Seyfetdinov | |
| 2011/0286585 A1 | 11/2011 | Hodge | |
| 2012/0014517 A1* | 1/2012 | Orr | H04M 3/382 |
| | | | 379/142.05 |
| 2012/0281058 A1 | 11/2012 | Laney et al. | |
| 2013/0308499 A1 | 11/2013 | Hodge | |
| 2014/0044242 A1 | 2/2014 | Hodge et al. | |
| 2014/0218466 A1 | 8/2014 | Bloms et al. | |
| 2014/0219432 A1 | 8/2014 | Bengston et al. | |
| 2014/0270126 A1 | 9/2014 | Torgersrud et al. | |
| 2014/0280559 A1 | 9/2014 | Torgersrud | |
| 2014/0280632 A1* | 9/2014 | Torgersrud | H04L 51/32 |
| | | | 709/206 |
| 2014/0282896 A1* | 9/2014 | Torgersrud | H04L 63/02 |
| | | | 726/4 |
| 2014/0348321 A1 | 11/2014 | Javaregowda et al. | |
| 2015/0215254 A1* | 7/2015 | Bennett | H04L 51/12 |
| | | | 709/206 |
| 2016/0066182 A1 | 3/2016 | Hodge et al. | |
| 2016/0219146 A1 | 7/2016 | Hodge et al. | |
| 2016/0381082 A1 | 12/2016 | Hodge et al. | |
| 2017/0208468 A1 | 7/2017 | Hodge et al. | |
| 2017/0236127 A1* | 8/2017 | Tahir | G06Q 30/014 |
| | | | 705/7.32 |
| 2017/0251100 A1* | 8/2017 | Keiser | H04L 63/10 |
| 2017/0272440 A1 | 9/2017 | Hodge | |
| 2018/0103153 A1* | 4/2018 | Torgersrud | H04M 3/436 |

OTHER PUBLICATIONS

Downloaded from TextInmate.com by Phone Donkey, Retrieved from internet: https://textinmate.com/, Jun. 20, 2018.

Downloaded from Inmate Phone Texting Pictures, Retrieved from Internet: https://klolk.com/, Jun. 20, 2018.

Screen captures from Affordable Inmate Calling Services, Retrieved from Internet: https://www.aicsllc.net/, Jun. 20, 2018.

* cited by examiner

| Inmate User ID (56) | Current Account Balance (58) | Associated Account Number (60) | Associated Civilian Mobile ID (64) |
|---|---|---|---|
| Bob378 | $213.45 | 123456 | 123-456-7899 |
| Bob378 | $213.45 | 654321 | 987-654-3211 |
| Frank582 | (-)$25.00 | 741852 | 741-852-9633 |

FIG. 5

| Civilian User ID (62) | Mobile ID (64) | Inmate Account Number (60) |
|---|---|---|
| Mary379 | 123-456-7899 | 123456 |
| Edward398 | 987-654-3211 | 654321 |
| Ryan659 | 741-852-9633 | 741852 |

FIG. 6

| Action Record ID | Triggering Event | Action Event Data | Action Event |
|---|---|---|---|
| Action001 | Receive Message | Determine whether message received is from a current civilian user | Application Server Event |
| Action002 | Current Civilian sends message | Pair the current civilian with inmate account number | Application Server Event |
| Action003 | Receive message with emoticons | Remove emoticons from the message | Application Server Event |
| Action004 | Receive message with images | Remove images from message received | Application Server Event |
| Action005 | Send received messages to 3rd party server | Send the images removed from the message to a 3rd party server and print out the images to be given to the inmate. | External Server Event |
| Action006 | Unpaid Inmate Account Balance | Send a message that the inmate cannot receive any messages until the account balance is paid. | Application Server Event |

FIG. 7

| Civilian User ID | Mobile ID | Inmate Account Number | Action Rule File | Rule Description | Notification Message File | Messaging Information |
|---|---|---|---|---|---|---|
| Molly859 | 963-852-7411 | N/A | Action00 1.1. API | Determine whether message received is from a current civilian user | InfoMessage 001.1 | Ask for inmate account or inmate user ID to be paired |
| Mary379 | 123-456-7899 | 123456 | Action00 2.1. API | Pair the current civilian with inmate account number | InfoMessage 002.1 | Pair the civilian profile with the correct inmate profile |
| Mary379 | 123-456-7899 | 741852 | Action00 6.1. API | Send message to pay inmate account balance | InfoMessage 006.1 | Send a message that the inmate cannot receive any messages until the account balance is paid. |

FIG. 8

| Inmate User ID (56) | Current Account Balance (58) | Associated Account Number (60) | Associated Civilian Mobile ID (64) | Carrier (116) |
|---|---|---|---|---|
| Bob378 | $213.45 | 123456 | 123-456-7899 | Aerialink/Geneseo (SVR) |
| Bob378 | $213.45 | 654321 | 987-654-3211 | Aerialink/Geneseo (SVR) |
| Frank582 | (-)$25.00 | 741852 | 741-852-9633 | Bandwidth CLEC (Sybase) |

FIG. 14

| Civilian User ID (62) | Mobile ID (64) | Inmate Account Number (60) | Carrier (118) |
|---|---|---|---|
| Mary379 | 123-456-7899 | 123456 | AT&T Local |
| Edward398 | 987-654-3211 | 654321 | BHNIS |
| Ryan659 | 741-852-9633 | 741852 | Bluegrass Cellular |

FIG. 15

| Action Record ID | Triggering Event | Action Event Data | Action Event |
|---|---|---|---|
| Action010 | Determine Carrier of the New User | Determine whether the carrier of the new user is an allowed carrier or not. | Application Server Event |
| Action011 | Send the user profile to an appropriate list | Upon determining the new user carrier, send to either an allowed list or a blocked list of carriers. | Application Server Event |
| Action012 | Send received carrier to 3rd party server | Send the new user information to a 3rd party server to determine the carrier. | External Server Event |
| Action013 | Receive SMS Message that includes a predetermined amount of characters | Break the SMS message into a plurality of SMS messages. | Application Server Event |
| Action014 | Receive a plurality of SMS messages | Convert the plurality of SMS messages into one MMS message. | Application Server Event |
| Action015 | Receive the MMS message | Convert the MMS message into a readable SMS message | Application Server Event |
| Action016 | Send the MMS message to a 3rd party server | Send the MMS message to a 3rd party server to be converted to a readable SMS message | External Server Event |

FIG. 16

| Civilian User ID | Inmate Account Number | Carrier | Action Rule File | Rule Description | Notification Message File | Messaging Information |
|---|---|---|---|---|---|---|
| Mary379 | 123456 | AT&T Local | Action01 1.1. API | Upon determining the new user carrier, send to either an allowed list or a blocked list of carriers. | InfoMessage 011.1 | Send user profile to the allowed list or the blocked list of carriers |
| Mary379 | 123456 | AT&T Local | Action01 5.1. API | Convert the MMS message into a readable SMS message | InfoMessage 015.1 | Send the MMS message to a 3rd party server to be converted to an SMS message |
| Mary379 | 123456 | AT&T Local | Action01 6.1. API | Send the MMS message to a 3rd party server to be converted to a readable SMS message | InfoMessage 016.1 | Send the MMS message to be sent back as a SMS message |

FIG. 17

| Inmate User ID | Current Account Balance | Associated Account Number | Associated Civilian Device ID | Carrier |
|---|---|---|---|---|
| Bob378 | $213.45 | 123456 | 123-456-7899 | Aerialink/Geneseo (SVR) |
| Bob378 | $213.45 | 654321 | 987-654-3211 | Aerialink/Geneseo (SVR) |
| Frank582 | (-)$25.00 | 741852 | 741-852-9633 | Bandwidth CLEC (Sybase) |

FIG. 24

| Civilian User ID | Device ID | Inmate Account Number | Carrier |
|---|---|---|---|
| Lily895 | 456798123456 | 123456 | Century Link |
| Edward398 | 987-654-3211 | 654321 | BHNIS |
| Tyler582 | 854857854858 | 741852 | Cox Communications |

FIG. 25

| Action Record ID | Triggering Event | Action Event Data | Action Event |
|---|---|---|---|
| Action020 | Receive Message | Determine whether the message contains a video communication request | Application Server Event |
| Action021 | Message includes a video communication request | Send the message to the associated profile | Application Server Event |
| Action022 | Receive an answer to the video communication request | The answer includes a yes or a no to the video communication request to be send to the associated profile | Application Server Event |
| Action023 | Receive a yes to the video communication request | Establish the video communication between the associated profiles for a predetermined time | Application Server Event |
| Action024 | Predetermined Time for video communication request | Open the video communication between the associated profiles at the predetermined time | Application Server Event |
| Action025 | Receive a no to the video communication request | Send a message back to the associated profile that the video communication request has been denied | Application Server Event |

FIG. 27

| Civilian User ID | Inmate Account Number | Carrier | Action Rule File | Rule Description | Notification Message File | Messaging Information |
|---|---|---|---|---|---|---|
| Lily895 | 123456 | Century Link | Action02 3.1. API | Receive a yes to the video communication request | InfoMessage 023.1 | Establish the video communication between the associated profiles for a predetermined time |
| Lily895 | 123456 | Century Link | Action02 4.1. API | Predetermined Time for video communication request | InfoMessage 024.1 | Open the video communication between the associated profiles at the predetermined time |
| Lily895 | 123456 | Century Link | Action02 5.1. API | Receive a no to the video communication request | InfoMessage 025.1 | Send a message back to the associated profile that the video communication request has been denied |

FIG. 28

| Inmate User ID | Current Account Balance | Associated Account Number | Associated Civilian Device ID | Verification ID |
|---|---|---|---|---|
| Ryan765 | $526.12 | 852963 | 456-125-4562 | 😀 |
| Todd543 | $98.15 | 578463 | 345-890-1278 | 🙂 |
| Todd543 | $98.15 | 578463 | 456-789-0987 | 🙂 |

FIG. 30

| Civilian User ID | Device ID | Inmate Account Number | Verification ID |
|---|---|---|---|
| Lisa852 | 456-125-4562 | 852963 | 👧 |
| Ryan675 | 456-789-0987 | 578463 | 456-789-0987<br>Ryan Smith |
| Tyler582 | 345-890-1278 | 578463 | IDDOO000123456<5<<<<<<<br>1951526M2001512D<<<<<<<br>DOE<<TYLER<<<<<<<<<< |

FIG. 31

| Action Record ID | Triggering Event | Action Event Data | Action Event |
|---|---|---|---|
| Action026 | Receive Message | Determine whether the message includes a verification ID | Application Server Event |
| Action027 | While waiting for determination of verification ID | Hold the received message awaiting verification of the verification ID | Application Server Event |
| Action028 | Message includes a verification ID | Verify the verification ID by comparing the verification ID with a user account | Application Server Event |
| Action029 | Receive a verification ID that matches a current user profile verification ID | Allow communication with the verified user | Application Server Event |
| Action030 | Receive a verification ID that does not match a current user profile | Create a new user profile | Application Server Event |
| Action031 | Receive a new verification ID | Verify the new verification ID | Application Server Event |
| Action032 | Receive a verified user | Send the verified user to the appropriate list for future messaging | Application Server Event |
| Action033 | Send a message to a user that hasn't been verified | Receive a message including a phone number and a Caller ID Name | Application Server Event |

FIG. 32

SYSTEM AND METHOD FOR FACILITATING COMMUNICATIONS BETWEEN INMATES AND NON-INMATES

The present application is a continuation-in-part of U.S. Non-Provisional patent application Ser. No. 16/049,375, filed Jul. 30, 2018, which claims priority to and is a continuation-in-part of U.S. Non-Provisional patent application Ser. No. 15/926,675, filed Mar. 20, 2018, which claims priority to and the benefit of U.S. Provisional Patent Application Ser. No. 62/588,061, filed Nov. 17, 2017, and U.S. Provisional Patent Application Ser. No. 62/627,558, filed Feb. 7, 2018, the disclosures of all of which are hereby incorporated by reference in their entirety.

BACKGROUND OF THE INVENTION

1. Field of the Invention

The present invention relates generally to the field of electronic messaging exchange in penal institutions or similar facilities and, more particularly, to a system and method that is centralized and self-contained with the capacity to monitor, control access, and bill for usage of electronic messaging in penal institutions or similar facilities.

2. Description of the Related Art

Typical electronic messaging exchange systems for residents of controlled environments such as penal institutions or similar facilities include a centralized call center from which residents (also known as inmates) can make telephone calls over hardwired landlines. Alternatively, there may be several hardwired telephones scattered throughout the facility from which the inmates can make calls.

In the electronic messaging exchange system, all telephone calls and messaging are routed through a central processing center, which may be located on-site or off-site. The processing center can conventionally act as a local switching center for connecting calls, or can perform security functions, such as caller authentication, call monitoring, etc. In addition, the processing center assigns each inmate a SIM card or a personal phone number requiring a mass amount of SIM cards and personal phone numbers.

The restriction to using a personal phone number or separate SIM card for every inmate hampers the inmate communication and is relatively cumbersome, potentially leading to a system failure if overloaded with information.

SUMMARY OF THE INVENTION

The present invention provides a system for verifying the identity of users associated with user profiles for messaging between civilian profiles and inmate profiles. The system includes a database and an application server. The database includes a plurality of user profiles. The application server includes a processor programmed with an algorithm to execute steps to receive a message from a user, the message including a verification ID, hold the message for verification of the user, verify the user via the verification ID, allow a communication with the verified user, and send the verified user to an appropriate list for future messaging.

In another embodiment, the present invention provides a method for verifying the identity of users associated with user profiles for messaging between civilian profiles and inmate profiles. The method includes the steps of receiving, by an application server, a message from a user, the message including a verification ID, holding, by the application server, the message for verification of the user, verifying, by the application server, the user via the verification ID, allowing, by the application server, a communication with the verified user, and sending, by the application server, the verified user to an appropriate list for future messaging.

In yet another embodiment, the present invention provides one or more non-transitory computer-readable storage media, having computer executable instructions embodied thereon, where when executed by at least one processor, the computer-executable instructions cause the processor to access a database including a plurality of user profiles, receive a message from a user, the message including a verification ID, hold the message for verification of the user, verify the user via the verification ID, allow a communication with the verified user, and send the verified user to an appropriate list for future messaging.

Other advantages of the present invention will be readily appreciated, as the same becomes better understood, by reference to the following detailed description when considered in connection with the accompanying drawings.

BRIEF DESCRIPTION OF THE DRAWINGS

FIGS. 5-9 are table views illustrating exemplary database records generated by the system of FIG. 1.

FIGS. 14-19 are table views of exemplary database records generated by the system of FIG. 1.

FIGS. 24-28 are table views of exemplary database records generated by the system of FIG. 1.

FIGS. 30-33 are table views of exemplary database records generated by the system of FIG. 1.

Corresponding reference characters indicate corresponding components throughout the several views of the drawings.

DESCRIPTION OF THE PREFERRED EMBODIMENT(S)

Figure 1:
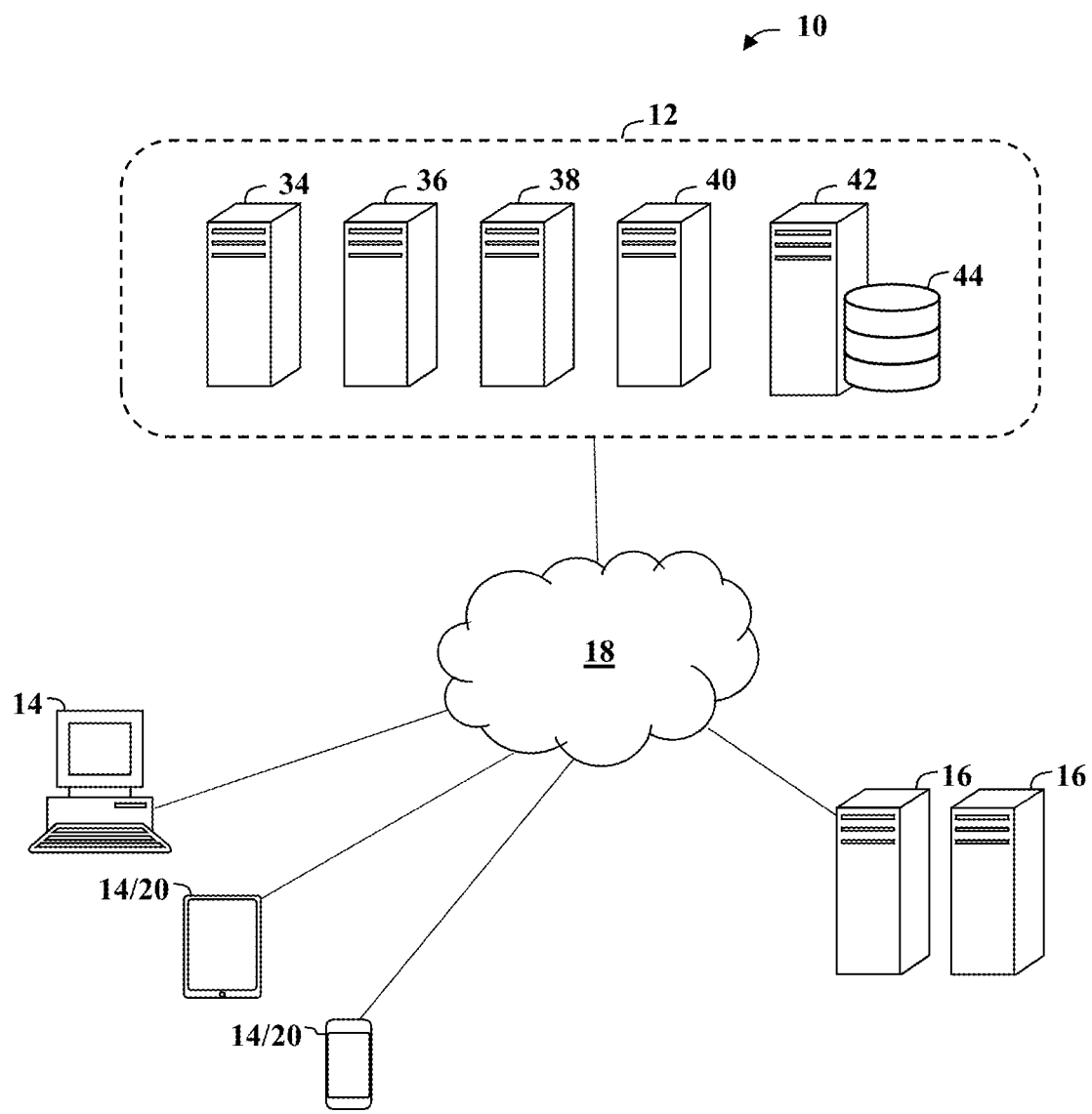
FIG. 1 is a schematic view illustrating various aspects of a system, according to the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, a reasonable programmable read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will be appreciated that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instructions which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the present invention provides a system 10 such as a networked computer system that is configured to generate information related processing of incoming and outgoing messages between inmates and non-inmates or civilians. The system 10 includes application software that enables the system 10 to provide a platform for penal institutions to monitor, control access, and bill for usage of such a system including determining specific data about users sending messages between inmates and non-inmates or civilians, and withholding messages if the data does not meet a predefined criteria. It should be appreciated that the term "inmate" refers to a "person in a prison or jail" or "incarcerated individual". It also should be appreciated that the term "civilian" refers to a "non-inmate" and "civilians" refers to "non-inmates" as used in the subsequent description.

The application software provides the system 10 with a platform to allow civilians and inmates to send messages back and forth on a secure network without burning out the system 10 using multiple SIM cards/phone numbers. The system 10 assigns the civilian's phone number to a specific inmate user ID. The user ID may have multiple inmate account numbers associated with the inmate user ID, allowing the inmate to send and receive messages with multiple civilians using separate SIM cards or phone numbers. The application software allows the inmates and civilians to spend less money messaging each other. The application software uses less SIM cards/phone numbers to keep the overall costs down. The application software includes a program version that has a user version available in all the application stores and potentially pre-installed as a part of default carrier software loads (for example: AT&T, Sprint, Verizon, etc.) that will provide the functionality to be described below. Several elements discussed below and/or claimed are described as being provided for, or, by "a user", "an inmate", or "a civilian" and may be interchangeable throughout and described below.

In addition, the system 10 provides a way for the inmate to communicate with the civilian over a network that will not burn out or overload the system 10. Moreover, the system 10 communicates with a mobile device associated with the inmate or the civilian to provide notifications to the mobile device including messages about incoming messages, incoming video communications, and whether a civilian has opted-in. In addition, the system 10 may send outgoing actions to $3^{rd}$ party computer servers to print images that were removed from messages, determine a user's carrier, and convert MMS messages into SMS messages. The external server may communicate with the $3^{rd}$ party computer server to send the image to be printed for mailing or delivering to the inmate. In addition, the external server may communicate with the $3^{rd}$ party computer server to send carrier information to the application server. The external server may communicate with the $3^{rd}$ party computer server to convert MMS messages into SMS messages using, for example, optical character recognition systems. The system 10 determines through the application server the action events and triggering events between the external server and the $3^{rd}$ party computer server. The system 10 may then transmit push notifications to the user with information about images that were removed and printed for the inmate. The system 10 may also include a mobile computer application being stored on a mobile device associated with the user. The mobile application uses location and public API's to send notifications to the user. For example, in one embodiment, the civilian may receive a notification that the inmate has sent a message where the civilian may send a message back that includes an image. The system 10 may send the image to the $3^{rd}$ party server to be printed and mailed to the inmate through the postal service. The system 10 may send the MMS message to an optical character recognition system to convert the MMS message into a SMS message.

The system 10 is configured to generate and store user data records associated with inmates and civilians that include information associated user accounts and messages being sent between the inmate and the civilian. The system 10 also determines action events that are associated with the messages sent between the inmate and the civilian. The system 10 generates and stores action records that include information associated with actions to be performed by the system 10 upon detecting activities being performed by the user. For example, the action events may include determining whether the civilian profile is a current civilian profile and determining whether the message sent by the civilian to the inmate meets the predefined criteria.

In addition, the user data records may include triggering events that are detected by the system 10 to initiate the action events. The triggering events may include, for example, receiving a message that includes too many characters in the message, at least one emoticon, at least one image, receiving a new user profile, receiving a carrier, and receiving a MMS message.

By generating action records 68 associated with user activities that include triggering events that trigger corresponding system actions, the system 10 improves the speed and functionality of known computing systems by reducing the amount of computing time required to monitor user activity, thus reducing the computing resources required to generate and display relevant data messages from multiple programs to the user.

In addition, the system 10 reduces the computing resources required to manage the data information associated with the sending of information between the inmate and the civilian over known systems by generating data files associated with inmate profiles and civilian profiles that can be quickly paired based on current user record data to generate electronic messaging using limited computing resources.

In addition, the system 10 reduces the computing resources required to manage the data information associated with the sending of information between the inmate and the civilian over known systems by blocking correspondence based on the user carrier information and converting MMS messages to SMS messages using IP based numbers.

In addition, the system 10 reduces the computing resources required to manage the data information associated with the sending of information between the inmate and the civilian over known systems by generating data files associated with inmate profiles and civilian profiles that can be quickly paired based on current user record data to generate rich communication service (RCS) messaging using limited computing resource.

In addition, the system 10 reduces the computing resources required to manage the data information associated with the sending of information between the inmate and the civilian over known systems by generating data files associated with inmate profiles and civilian profiles that can be quickly paired based on current user record data to generate and facilitate video communications using limited computing resources.

Referring to FIG. 1, in one illustrated embodiment, the system 10 includes a server system 12 that is coupled in communication with one or more user computing devices 14 and one or more 3$^{rd}$ party computer servers 16 via a communications network 18. The server system 12 may be any suitable server, including an internet transaction server (ITS), an ATG application server or an ATG application instance, a Dynamo server, etc. . . . , and may utilize any suitable or combination of technologies configured to enable efficient communication. The communications network 18 may be any suitable connection, including the Internet, Voice Over IP (VoIP), file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 14 may include any suitable device that enables the user to access and communicate with the system 10 including sending and/or receiving information to and from the system 10 and displaying information received from the system 10 to the user. For example, in one embodiment, the user computing device 14 may include, but is not limited to, a desktop computer, a laptop or notebook computer, a tablet computer, a smartphone/tablet computer hybrid, a personal data assistant, a handheld mobile device including a cellular telephone, and the like. The user computing device 14, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), short message peer-to-peer ("SMPP") protocol, the simple network paging protocol ("SNPP"), the Telocator network paging protocol ("TNPP"), the simple network paging protocol ("SNPP"), etc.) over the network. The messages being sent and received between the user computing devices 14 may be short message service messages (SMS), multimedia messaging service (MMS), a rich communication service (RCS) chat message, a RCS file, enhanced messaging service (EMS) message, etc., over a particular communication protocol and/or call-interfaces. SMS messaging, also known as text messaging, is a way to send short, text-only messages from one user computing device 14 to another. MMS messaging allows the user computing devices 14 to send each other multimedia messages, for example, images, slideshows, audio files, audio clips, etc. RCS messaging, also known as chat messaging, is a network based on an Internet Protocol (IP) Multimedia Subsystem (IMS) for providing communication services to and between users.

In one embodiment, the user computing device 14 includes a mobile computing device 20 (shown in FIG. 2) such as, for example, a smartphone such as an iPhone™. Both the user computing device 14 and the mobile computing device 20 include a processor coupled to a memory device, and a database 44 for storing various programs and data for use in operating the mobile computing device 20. The mobile computing device 20 may also include a touchscreen display device 22, one or more video image cameras 24, one or more speakers 26, a microphone 28, at least one input button 30, and one or more sensors including, but not limited to, a touch ID fingerprint sensor coupled to an input button 30, a barometer, a three-axis gyro, an accelerometer, a proximity sensor, and an ambient light sensor. In addition, the mobile computing device 20 may also include a Wi-Fi antenna, a cellular network antenna, a Bluethooth™ communications device, assisted GPS and GLONASS, a digital compass, and an iBeacon microlocation device.

Figure 2:
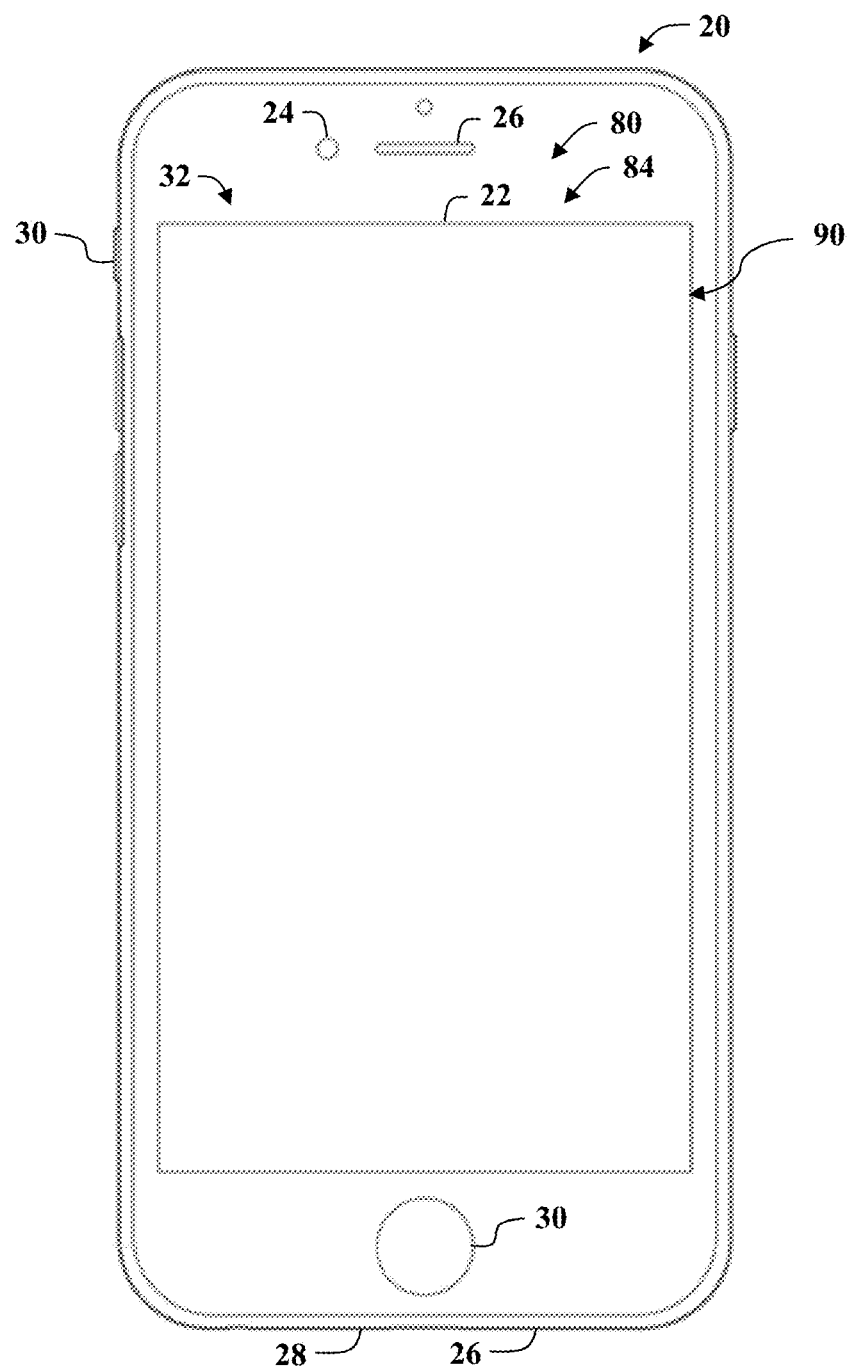
FIG. 2 is a plan view of a component of the system of FIG. 1.

In the illustrated embodiment of FIG. 2, the mobile computing device 20 includes a web browser programmed and stored in the memory device. The processor executes the web browser program to display web pages on the touchscreen display device 22 that includes information received from the server system 12 to enable the user to interact with and operate the server system 12. In addition, the mobile computing device 20 may be programmed to store and execute a mobile program application, e.g., a mobile application, that displays a user interface 32 on the touch screen display device 22 that allows the user to access the server system 12 to retrieve and store information within the server system 12 as well as interact with and operate the server system 12. In addition, in one embodiment, the system 10 may install one or more mobile application programs in the memory device of the mobile computing device 20. When initiated by the processor of the mobile computing device 20, the mobile application program causes the processor of the mobile computing device 20 to perform some or all of the functions of the server system 12.

The $3^{rd}$ party computer servers 16 include information and data associated with the processing of images removed from incoming messages, determining the carriers of new users, and converting MMS messages into SMS messages. For example, in one embodiment, the $3^{rd}$ party computer servers 16 may include information associated with an image printing system that receives a request to print images to be mailed to the inmates.

In the illustrated embodiment of FIG. 1, the server system 12 includes one or more servers such as a website hosting server 34, a search engine server 36, an application server 38, an external server 40, a database server 42, and a database 44. The database server 42 includes a memory device that is connected to the database 44 to retrieve and store information contained in the database 44. The database 44 contains information on a variety of matters, such as, for example, web pages associated with one or more websites, a plurality of user records, a plurality of user IDs, a plurality of mobile IDs, a plurality of inmate account numbers including account data, action events, trigger events, notification messages, device identifiers, device application program interfaces (APIs), mobile device identifiers, mobile device application program interfaces (APIs), verification IDs, and/or any suitable information that enables the system 10 to function as described herein. In one embodiment, some or all of the information contained in the database 44 may also be stored in the database of the mobile computing device 20.

In one embodiment, the database 44 includes a user records list 46 (shown in FIGS. 5 and 6) that includes a plurality of user records 48. Each user record 48 includes a unique user profile 50. The unique user profile 50 can be an inmate profile 52 or a civilian profile 54. Each inmate profile 52 includes a unique user inmate user ID 56, a current account balance 58, and at least one user account number 60. The at least one user account number 60 is associated with a civilian user ID 62. The civilian user ID 62 may also be a code word to help identify the civilian profile 54. Each civilian profile 54 includes a unique civilian user ID 62 associated with a corresponding civilian, a mobile ID 64 associated with a mobile computing device 20, and at least one inmate account number 60. The unique civilian user ID 62 and the unique inmate user ID 56 include user identifying data such as, for example, a unique ID and/or password, and may also include user contact information such as, for example, a phone number, an e-mail, and/or a mobile device data associated with a mobile computing device 20 associated with the user. For example, the mobile device data may include, but is not limited to, the unique mobile device ID 64, operating system, phone number, IP address, mobile device API, and/or any suitable information that enables the system 10 to communicate with the corresponding mobile computing device 20. The data associated with the inmate account number 60 includes the inmate identifying data such as, for example, a unique ID and/or password and an account balance 58. Each inmate account number 60 is associated with a separate device to facilitate the data between the system 10 and the civilian mobile user device 20.

In one embodiment, the database 44 also includes an action event record list 66 (shown in FIG. 7) that includes a plurality of action event records 68. Each action event record 68 may include a triggering event 70, action event data 72, and the action event 74. The system 10 may initiate the action event 74 once the action event 74 is triggered by the triggering event 70. By the action event 74 being triggered by the triggering event 70, the action event 74 may then send the action event 74 to the corresponding server, dependent on which action event 74 has been triggered. Action event data 72 includes information and data including, but is not limited to, determining whether a civilian profile 54 is a current user or not, determining whether a message has been sent, determining whether the message includes predefined criteria, and determining the civilian profile 54 that is paired with the inmate profile 52. As shown in FIG. 7, the action event data 72 description may include data associated with the corresponding action record. For example, in one embodiment, the action event data 72, Action003, includes information that enables the system 10 to remove any emoticons from the message being sent to the inmate profile 52. The triggering event data includes data associated with the triggering event 70 that includes an event or occurrence that may be detected by the system 10. The triggering events 70 may include, but are not limited to, requests and/or signals received by the user computing device 14, for example, the civilian profile 54 may send a message including emoticons and/or images, messages that contain too many characters, too many messages sent in a predetermined amount of time, and receiving a civilian profile 54 that is not current or opted in. Once the system 10 initiates the triggering event 70, the triggering event 70 triggers the corresponding action event 74, which will send the action event data 72 to the corresponding server.

The database 44 may also include a user action record list 76 (shown in FIG. 9) that includes a plurality of user action records 78 that are associated with a plurality of users. Each user action record 78 includes the user record 48 associated with the corresponding user ID 56/62, the action record ID 68, the triggering event 70, and action event data 72. In addition, the user action record 78 may also include messaging information 80 having data and information to be sent with a mobile computing device 20 associated with the corresponding user profile 52/54 and/or API information associated with the corresponding mobile computing device 20. The messaging information 80 may be sent via SMS, MMS, RCS, and/or any other type of messaging application. In one embodiment, the messaging information 80 may also include contact information such as, for example, emails, and/or text, and phone numbers. The application server 38 may identify one or more additional users that may receive notifications generated by the web site hosting server 34 and include contact information associated with the identified additional users in the messaging information 80 that has sent or received a message using the system 10.

The website hosting server 34 is configured to host a website that is accessible by the user (also known as civilian or inmate) via one or more user computing devices 14. The website hosting server 34 retrieves and stores web pages 82 associated with one or more websites in response to requests received by the civilian or inmate via the user computing device 14 to allow consumers to interact with the web site and send and receive messages to the desired inmate in a penal institution. In one embodiment, the website hosting server 34 is configured to generate and display the messages on the inmate's user computing device 14 in response to messages being sent and received from the civilians profile via the corresponding web browsers that are displayed on the user computing devices 14. In addition, the website hosting server 34 may be configured to generate and display a mobile web page, the mobile web page can be either the civilian web page 82 or the inmate web page 82 that is displayed on one or more mobile computing devices 20. For example, in one embodiment, the website hosting server 34 may display a message sent to the inmate with less than 160 characters and that doesn't include any images or emoticons. In another embodiment, the website hosting server 34 is configured to generate and display a video communication 128 on the user computing device 14 in response to the video communication request 128 sent from a different user via the corresponding web browsers that are displayed on the user computing devices 14.

In the illustrated embodiment, the search engine server 36 is configured to receive a search request from the website hosting server 34 and/or the application server 38 including one or more search terms, and generate search data including a plurality of user records 48 as a function of the search terms. For example, in one embodiment, the search engine server 36 may initiate a search algorithm based on a Boolean model to search user records 48 and/or search terms that contain a specific inmate account number 60 and/or an inmate name and/or a unique inmate user ID 56 in the database 44 based on search terms received from the civilian profile 54 through the website hosting server 34 and/or received from the application server 38. For example, the civilian may not know the inmate account number 60 and may search the database 44 for a specific inmate by the inmate's name or unique inmate user ID 56. The civilian may need the unique inmate ID 56 in order to opt-into the system 10.

In the illustrated embodiment, the application server 38 is programmed to monitor activities associated with the plurality of user records 48 and process the messages being sent and received. Once the application server 38 receives a message from the civilian profile 54, the application server 38 may be configured to determine whether the civilian profile 54 is a current civilian profile 54 or not. If the civilian profile 54 is not a current civilian profile 54, the application server may send a message to the civilian profile 54 in order for the civilian profile 54 to opt-into the system 10. The application server 38 is further configured to pair the civilian profile 54 with the inmate profile 52 by accessing the database 44 to receive the data including the inmate profile 52 that is paired with the civilian profile 54. In another embodiment, the inmate profile 52 may be paired with more than one civilian profile 54. The inmate profile 52 may have separate account numbers 60 paired with different civilian profiles 54. The application server 38 may associate each inmate account number 60 with a specific SIM card/phone number.

In order for the application server 38 to process the message received from the opted in (current) civilian profile 54, the application server 38 is configured to process the message based on a predefined criteria 84. The predefined criteria 84 includes a splitting process 86, a holding process 88, and a removal process 90. The splitting process 86 includes determining whether the message sent from the civilian profile 54, or from the inmate profile 52 to the civilian profile 54, contains a specific amount of characters, such as a message that contains over 160 characters, which triggers the message to be split. If the message exceeds the 160 character limit, the entire message may be split into at least two messages. The at least two messages may not contain over 160 characters per message. The amount of characters may be set at any number up to 160 characters per message, depending on the system 10. The holding process 88 includes determining whether the system 10 has sent a predetermined amount of messages in a predetermined amount of time. For example, the predetermined amount of time may include fifty (50) to sixty (60) messages in one (1) hour. The predetermined amount of time may change depending on the carrier of phone service. In addition, the predetermined amount may be limited per carrier. For example, only fifty (50) messages may be sent for all Sprint™ users in an hour and only fifty-five (55) messages may be sent for all Verizon™ users in an hour of time, so on and so forth for all possible service providers. If the amount of messages in one (1) hour has been exceeded, the application server 38 may hold the message being sent until the time has expired. Once the time has expired, the application server 38 may complete the process of sending the message to the correct profile. In addition, the removal process 90 includes the removal of images and emoticons from the message being sent by the civilian profile 54 (or from the inmate profile 52). The application server 38 may remove any images from the message sent and then send the image removed to the $3^{rd}$ party server 16. The $3^{rd}$ party server 16 may print out the image and "snail mail" or deliver the image to the inmate. Once the application server 38 has processed the message through the splitting process 86, the holding process 88, and the removal process 90, the application server 38 may send the message to the paired inmate profile 52.

In another embodiment, the application server 38 is programmed to detect the occurrence of triggering events 70 associated with the plurality of user records 48 and the messages and/or video communications being sent and received. In addition, the application server 38 may also be programmed to monitor the information associated with the $3^{rd}$ party server 16 including sending the image information to the $3^{rd}$ party server 16 to be printed for viewing. The application server 38 may also be programmed to receive updates to user profiles 50 for use in determining whether the inmate profile 52 has added or removed any inmate account numbers 60 associated with civilian user IDs 62.

In the illustrated embodiment, the application server 38 is programmed to access the database 44 including a plurality of user records 48. In addition, the application server 38 is configured to receive a message from a civilian profile 54. The application server 38 is then configured to determine whether the civilian profile 54 is a current civilian profile 54. The application server 38 is configured to receive an inmate account number 60 associated with the message. Then the application server 38 is configured to process the message. The message then may meet a predefined criteria 84. The application server 38 is then configured to pair the message with the inmate account number 60. In addition, the application server 38 is configured to send the message to the inmate account number 60.

The application server 38 may send a request or triggering event 70 to the external server 42 triggering an action event 74 from the external server 40 to print and send images to the inmate sent from the civilian. For example, in Action005 shown in FIG. 7, the application server 38 is configured to send removed images to the 3rd party server 16. The images are removed from the message and sent to the 3$^{rd}$ party server 16 to be printed and sent to the inmate.

In the illustrated embodiment, as shown in FIG. 8, the application server 38 is programmed to receive a message from a non-current civilian profile 54 and send a second message to the user of the non-current civilian profile 54. The second message includes a request that asks for the inmate account number 60 to be associated to the non-current civilian profile 54. The non-current user may send back a name of an inmate or the inmate account number 60, which will allow the application server 38 to determine the inmate user ID 56 to pair the new non-current civilian profile 54 with the existing inmate profile 52. Once the application server 38 has paired the new civilian profile 54 with an existing inmate user ID 56 by creating a new account number associated with the existing inmate user ID 56, the non-current civilian profile 54 will be marked as a current civilian profile 54. For example, in FIG. 8, Molly859 sent a message to the application server 38 and before the inmate receives the message, the system 10 may pair the civilian with the intended inmate.

In another embodiment, illustrated in FIG. 8, the application server 38 is configured to determine whether the current civilian profile 54 is associated with more than one inmate account number 60. The application server 38 may determine the inmate account number 60 that is associated with the current civilian profile 54 and determine the inmate account number 60 that is associated with the message received. Then the application server 38 will pair the correct inmate account number 60 with the received message from a civilian. For example, Mary379, is paired with both account numbers 123456 and 741852. This allows the system 10 to pair Mary379 with two separate inmate account numbers.

In various embodiments, the application server 38 may remove predefined criteria 84 from the messages sent to the inmates. The predefined criteria 84 may include a predetermined amount of messages to be sent in a predetermined amount of time. As described above, the application server 38 may hold back messages if the threshold amount of messages has already been sent. In addition, the application server 38 may remove characters from the message and split the message into multiple messages if the message sent includes too many characters. In one embodiment, each message must be less than one hundred sixty (160) characters. The application server 38 is also configured to remove at least one emoticon from the message sent by the user and at least one image. The application server 38 is also configured to hold onto the message if the predetermined amount of messages to be sent in the predetermined amount of time has been exceeded and send the message once the predetermined amount of time has elapsed.

In one embodiment, the application server 38 is further configured to determine whether the inmate account balance 58 is paid for or if the account is outstanding. If the account balance 58 is not paid for or outstanding, the application server 38 may hold onto the message until the account balance 58 is up-to-date. The application server 38 is configured to send a third message to the civilian profile 54 if the account balance 58 is not up-to-date. Then, once the application server 38 receives a payment from either the inmate account or from the civilian profile 54 to pay for the inmate account balance 58, the application server 38 may send the message, originally sent from the civilian, to the inmate once the account balance 58 has been paid.

The application server 38 is configured to receive information from the website hosting server 34 and the search engine server 36, and send the information to the database server 42 to be stored in the database 44. In addition, the application server 38 is configured to receive action events 74 from the website hosting server 34 and the search engine server 36 and in response is configured to send triggering events 70 back to the plurality of servers 34, 36, 38, 40, 42. The application server 38 is configured to monitor the action events 74 and the triggering events 70 between all of the servers in the system 10. In another embodiment, the database server 42 receives all of the information collected by the application server 38 and stores the information in the database 44. This information includes messages sent and received, user profiles 50, and inmate account balances 58.

The external server 40 is configured to interact with the 3rd party server 16 that is outside of the application server 38. In addition, the external server 40 is configured to connect with the 3rd party server 16 using secret authentication mechanisms, application keys, call different methods on the external server 40, APIs, and reformat the results of the data back for use by the application server 38 so that the application server 38 can send the data to the website hosting server 34 to be displayed on the user computing device 14. The external server 40 is configured to be a bridge between the products and/or services completely separate from the application server 38. The products and/or services that are outside of the application server 38 include all external services, for example, any image printing service, carrier determining service, and/or an optical character recognition system. These products and/or services may provide information to the application server 38 that the sent images are ready for pick-up to be mailed to the inmates, and/or any information that may affect the data that is outside of the system 10.

Figure 3:
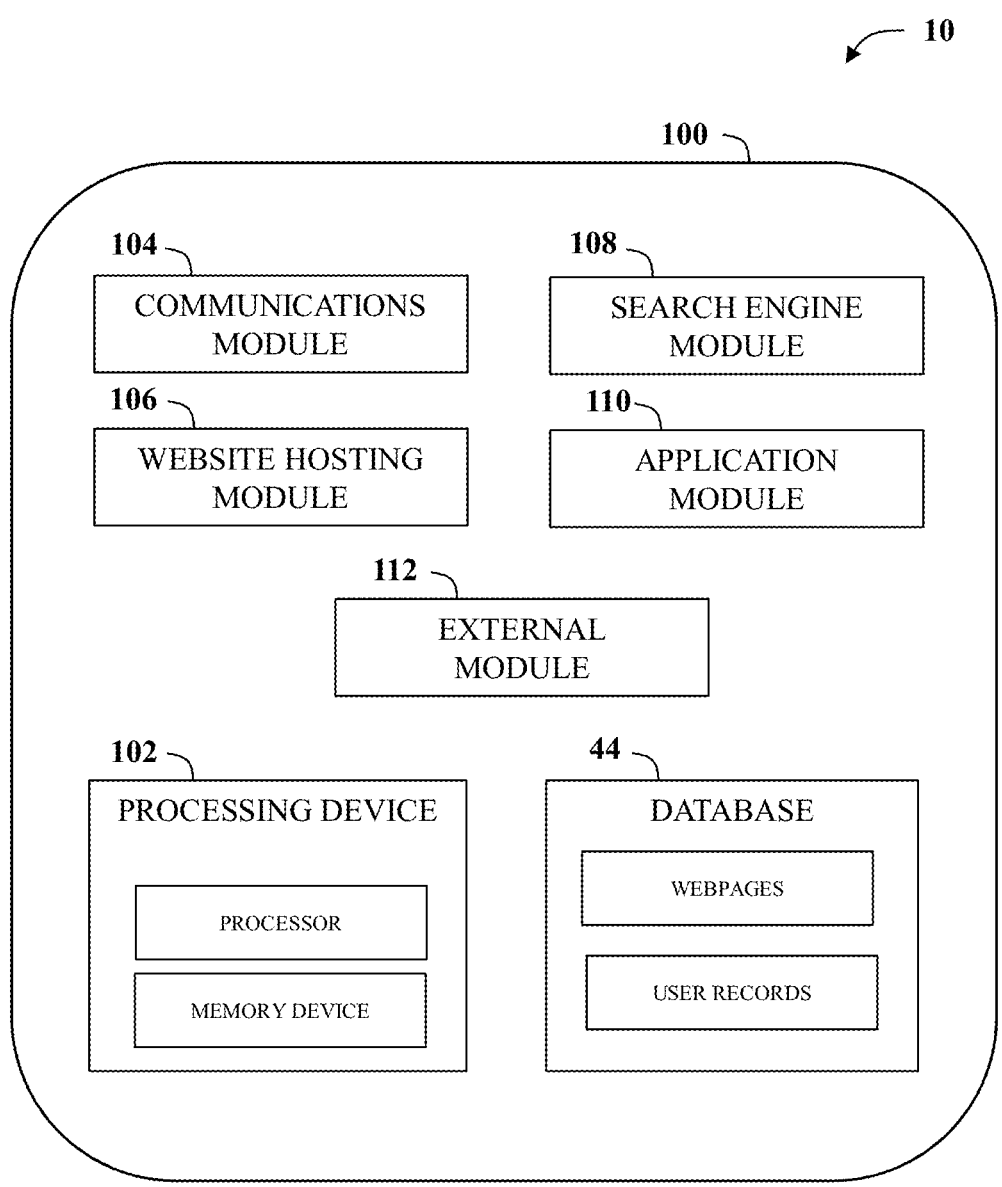
FIG. 3 is a schematic view illustrating example components of a server computer that may be used with the system shown in FIG. 1.

Referring to FIG. 3, in one embodiment, the system 10 may include a system server 100 that is configured to perform the functions of the website hosting server 34, the search engine server 36, the application server 38, the external server 40, and the database server 42. In the illustrated embodiment, the system server 100 includes a processing device 102 and the database 44.

The processing device 102 executes various programs, and thereby controls components of the system server 100 according to user instructions received from the user computing device 14. The processing device 102 may include memory, e.g., read only memory (ROM) and random access memory (RAM), storing processor-executable instructions and one or more processors that execute the processor-executable instructions. In embodiments where the processing device 102 includes two or more processors, the processors can operate in a parallel or distributed manner. In one example, the processing device 102 may execute a communications module 104, a website hosting module 106, a search engine module 108, an application module 110, and an external module 112.

The processing device 102 may also include a memory device for storing programs and information in the database 44, and retrieving information from the database 44 that is used by the processor to perform various functions described herein. The memory device may include, but is not limited to, a hard disc drive, an optical disc drive, and/or a flash memory drive. Further, the memory device may be distributed and located at multiple locations.

The communications module 104 retrieves various data and information from the database 44 and sends information to the user computing device 14 via the communications network 18 to enable the user to access and interact with the system 10. In one embodiment, the communications module 104 displays various images on a graphical interface of the user computing device 14 preferably by using computer graphics and image data stored in the database 44 including, but not limited to, user records, messages, and/or any suitable information and/or images that enable the system 10 to function as described herein.

The website hosting module 106 may be programmed to perform some or all of the functions of the website hosting server 34 including hosting various web pages 82 associated with one or more websites that are stored in the database 44 and that are accessible to the user via the user computing device 14. The website hosting module 106 may be programmed to generate and display webpages associated with a website in response to requests being received from users via corresponding web browsers.

The search engine module 108 may be programmed to perform some or all of the functions of the search engine server 36 including generating and storing search data in response to the user search request and/or application module 110 search requests.

The application module 110 may be programmed to perform some or all of the functions of the application server 38 including sending and receiving messages amongst the users, processing the messages, detecting trigger events from actions, and/or generating the messages between all of the modules.

The external module 112 may be programmed to perform some or all of the functions of the external server 40 including generating, receiving, and storing the external data including data from the 3rd party server computer 16.

Figure 4:
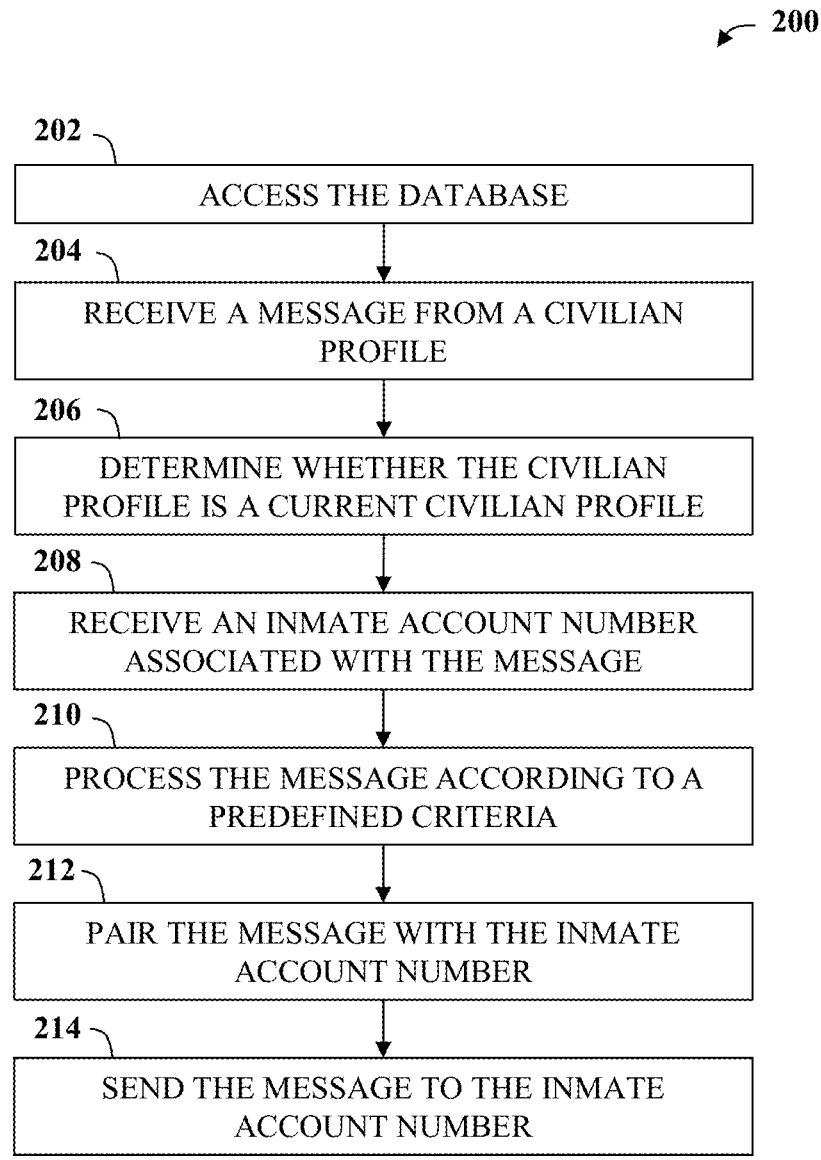
FIG. 4 is a flowchart of a method, according to one embodiment of the present invention that may be used with the system shown in FIG. 1.

Referring to FIG. 4, a flowchart of one embodiment of a method 200, according to the present invention, that may be used with the system 10 for providing controlled communications between inmates and civilians. The method 200 includes a plurality of steps. Each method step may be performed independently of, or in combination with, other method steps. Portions of the method may be performed by any one of, or any combination of, the components of the system 10.

In method step 202, the application server 38 accesses the database 44 that includes a plurality of civilian profiles 54 and a plurality of inmate profiles 52. Each civilian profile 54 includes a civilian user ID 62, a mobile ID 64 associated with a mobile device, and at least one inmate account number 60. Each inmate profile 52 includes an inmate user ID 56, a current account balance 58, and at least one account number 60. In method step 204, the application server 38 is configured to receive a message from a civilian profile 54.

In method step 206, the application server 38 is configured to determine whether the civilian profile 54 is a current civilian profile 54. The message may be received from a non-current civilian profile 54. In one embodiment, the application server 38 receives a message from a non-current civilian profile 54. The application server 38 sends a second message to the non-current civilian profile 54. The second message requests the inmate account number 60 to be associated to the non-current civilian profile 54. The application server 38 receives the inmate account number 60 to be associated with the non-current civilian profile 54 and the application server 38 may send information to the database 44 to mark the non-current civilian profile 54 as a current civilian profile 54.

Further, in method step 208, the application server 38 is configured to receive an inmate account number 60 associated with the message. The application server 38 determines whether the current civilian profile 54 is associated with more than one inmate account number 60. The application server 38 receives from the database 44 the inmate account number 60 that is associated with the current civilian profile 54. Then, the application server 38 determines the inmate account number 60 that is associated with the message received.

In method step 210, the application server 38 processes the message received from the civilian user ID 62. The messages must meet a predefined criteria 84. The predefined criteria 84 includes a predetermined amount of messages to be sent in a predetermined amount of time, a predetermined amount of characters included in the message, at least one emoticons, and at least one image.

In one embodiment, the application server 38 determines the predetermined amount of messages to be sent in the predetermined amount of time and determines whether the message includes the predetermined amount of characters included in the message. Once the message includes the predetermined amount of characters, the application server 38 removes the at least one emoticon from the message and/or removes the at least one image from the message.

In another embodiment, the application server 38 breaks the message into a plurality of messages if the message includes the predetermined amount of characters. In addition, the application server 38 holds onto the message if the predetermined amount of messages to be sent in the predetermined amount of time has been exceeded. In method step 212, the application server 38 pairs the message with the inmate account number 60.

Figure 9:
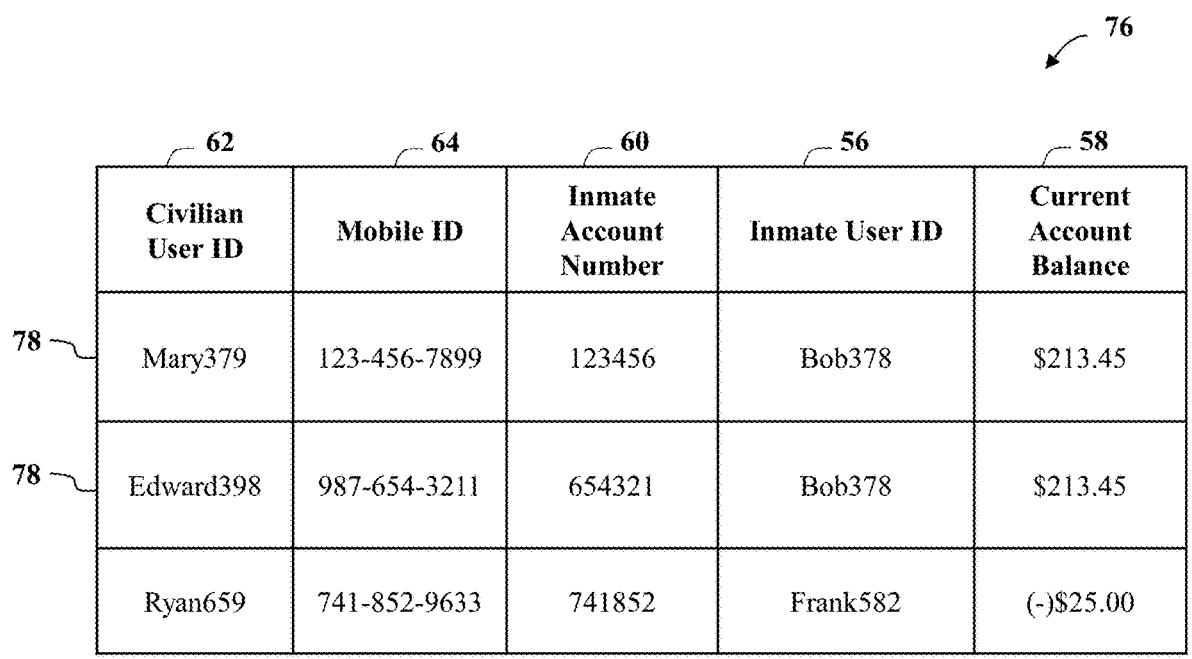

In yet another embodiment, the application server 38 determines whether the inmate account balance 58 is paid for or is outstanding (shown in FIG. 9). If the account balance 58 is not paid, the application server 38 may hold onto the message until the account balance 58 is up-to-date. The application server 38 sends a third message to the civilian profile 54 if the account balance 58 is not up-to-date. The application server 38 may receive a payment from the civilian profile 54 to pay for the inmate account balance 58. Once the account is paid for, or up to date, the application server 38 sends the message to the inmate once the account balance 58 has been paid. In method step 214, the application server 38 sends the message to the inmate account number 60.

In various embodiments, the system 10 limits the number of SMS/MMS messages sent to a SIM card during a period of time. This allows the SIM card to not burn out and to not be blocked by the cell phone companies. In addition, without limiting the flow of messages, there is no chance that a company would be successful for long using SIM cards to send messages. The flow of information goes from the civilian to the SIM card modem pool or the cell phone with a SMS application, is processed by the system 10 and through an ITS server to an ATG server, and then to the individual prison.

In another embodiment, the flow of information is the same as described above. When an inmate adds a new phone number to the list of contacts, the system 10 assigns a phone number/SIM card to the number. Instead of assigning a phone number for each inmate to use, the system 10 allows the use of a single phone number/SIM card for thousands of contacts. This allows the company to not have a large overhead. For example, instead of having unique phone numbers for each inmate, the system 10 allows thousands of inmates to use one phone number/SIM card. Another example includes the use of over sixteen thousand (16,000) inmates and the inmates contacts are able to be spread over twenty-four (24) phone numbers/SIM cards. Overall, the cost of 24 phone numbers is substantially cheaper than the cost of 16,000.

In various embodiments, the system 10 assigns each civilian phone number to a user computing device 14, never assigning a civilian's phone number to a user computing device 14 more than for one inmate. This allows the inmates to not have an individual phone number. Each user computing device 14 includes a device ID and a phone number. When a text message comes in on one of the user computing devices 14, the system 10 looks at the device ID and then looks for the phone number sending the text. The system 10 is able to tell who the civilian is intending to text. The advantage is to not allow inmates to have individual phone numbers and helps with security issues.

In another embodiment, a civilian may send a message to an inmate that does not have an active account (no money in the account). The system 10 may send a response to the civilian with instructions on how to activate the account. The system 10 may send a link that allows the civilian to pay the inmate account online and activate the account.

Figure 10:
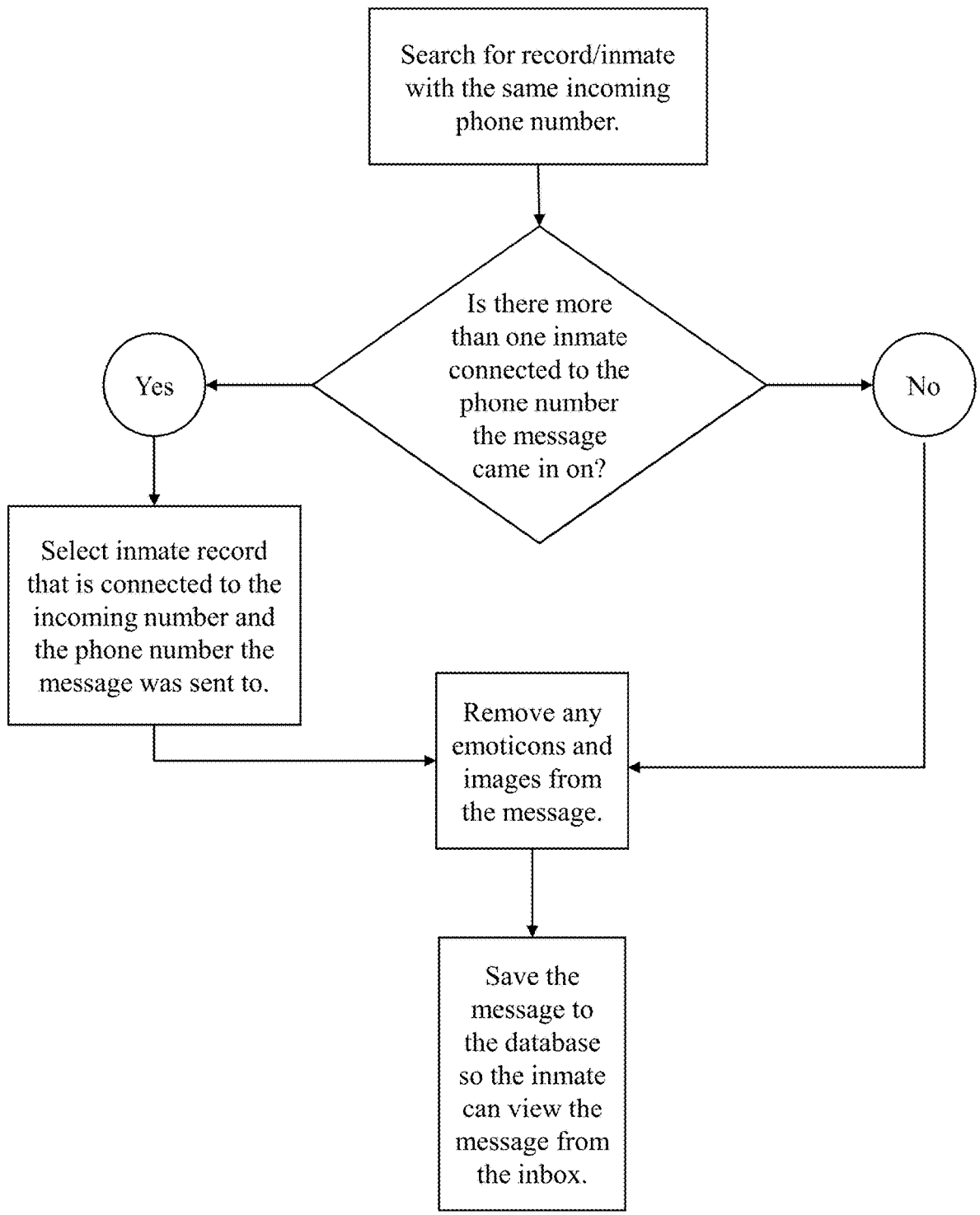
FIGS. 10-13 is a flowchart of a method, according to one embodiment of the present invention, for use with the system of FIG. 1.

Illustrated in FIG. 10, in one embodiment, the system 10 may search for a record and/or inmate with the same incoming phone number. The system 10 then determines if there is more than one inmate connected to the phone number the message was delivered. If there is more than one inmate, the system 10 may select the inmate record that is connected to the incoming number and the phone number the message was sent to. Then the system 10 may remove any emoticons and images from the message. The message may then be saved to the database 44 so the inmate can view the message from their inbox. If there is not more than one inmate, the system 10 may remove any emoticons and images from the message and save the message to the database 44 so the inmate can view the message from their inbox.

Figure 11:
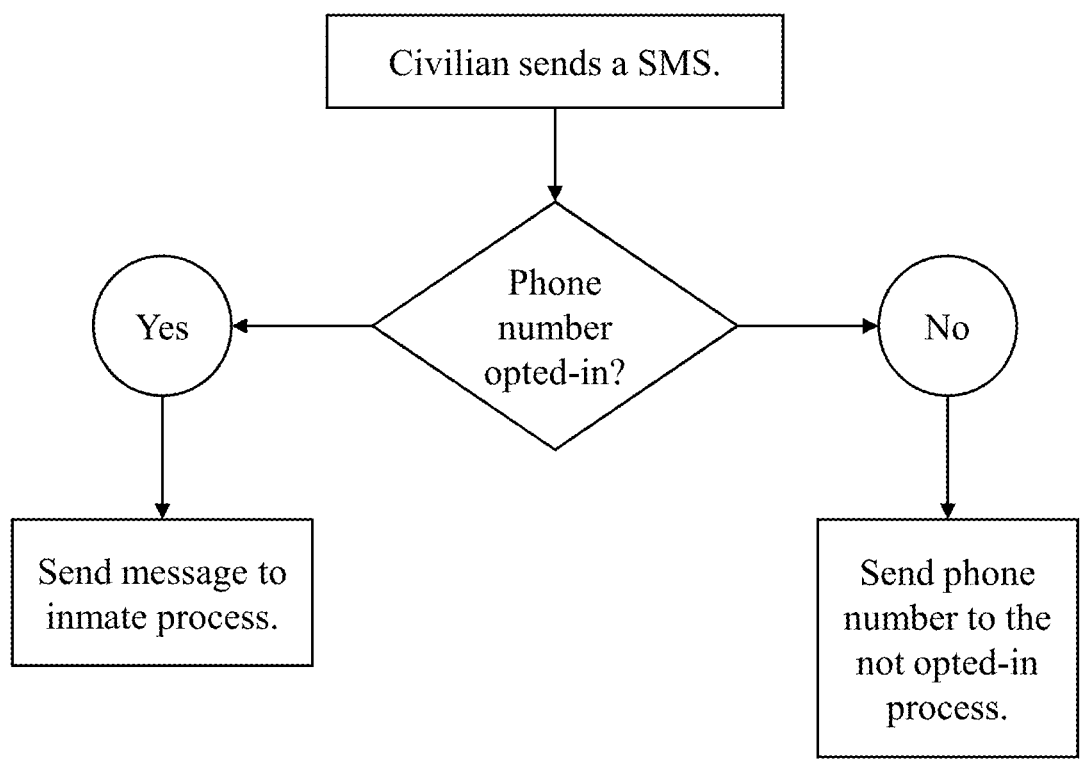

In one embodiment, illustrated in FIG. 11, if the civilian sends a SMS message, the system 10 may determine if the phone number is opted-in or not. If the phone number is not opted-in, the system 10 may require the phone number to go through the opt-in process. If the phone number is opted-in, the SMS message may be sent to the inmate.

Figure 12:
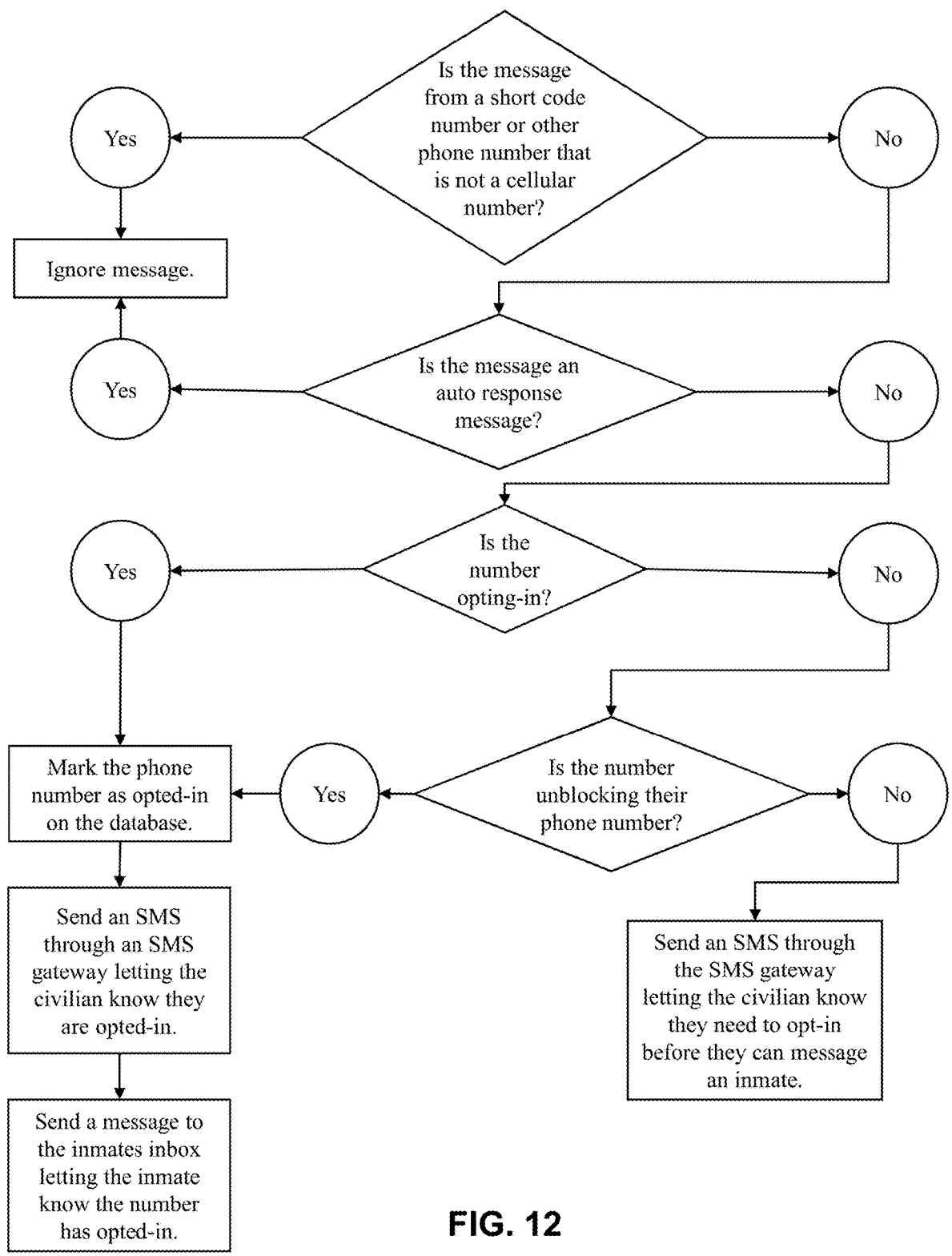

FIG. 12 illustrates the process if the message is received from a phone number that is not associated with a mobile device 20 or if the mobile device 20 is not a current user. If the message is from a short code number or other phone number that is not a cellular number, the system 10 may ignore the message. If the message is not a short code, the system 10 may determine if the message is an auto response message, and if so then ignore the message. Now, if the message is not received from a short code phone nor from an auto response message, the system 10 may determine whether the phone number is opted-in or not. If the message is not opted-in, the system 10 may ask the phone number to unblock their phone number. If the phone number continues to deny access to the phone number, the system 10 may send an SMS through an SMS gateway letting the phone number know that in order to message an inmate, the phone number must be opted-in. If the phone number decides to opt-in or is already opted-in, the system 10 may mark the phone number as opted-in and save the data to the database 44. Next, the system 10 may send an SMS through an SMS gateway letting the phone number know the opt-in process was successful. The system 10 then sends a message to the inmate inbox letting the inmate know the number has opted-in for messaging.

Figure 13:
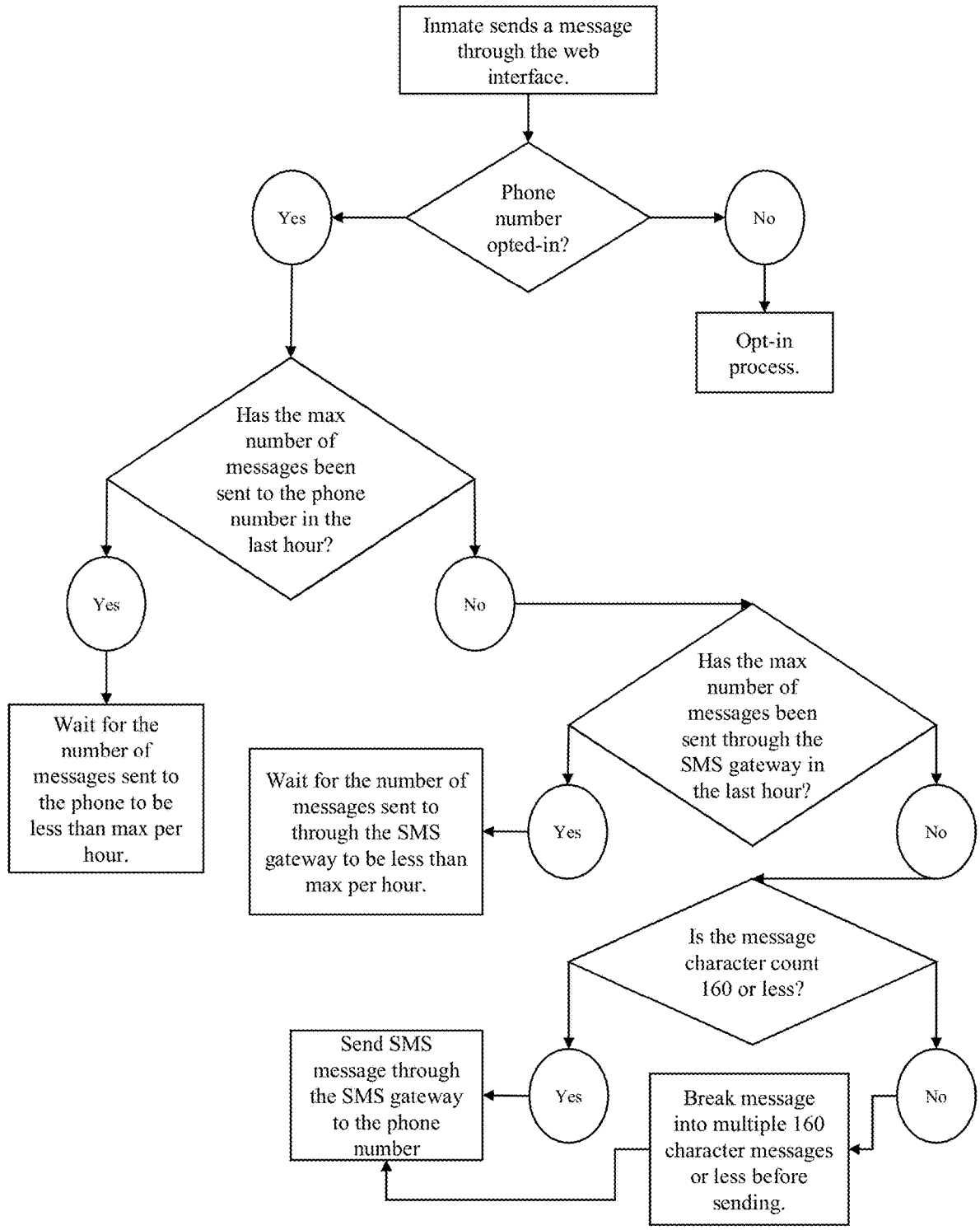

In another embodiment, FIG. 13 illustrates the process once the inmate sends a message through the system 10. The system 10 determines whether the receiving phone number has opted-into the system 10 or not. If the receiving phone number has not opted-in, the system 10 will require the phone to go through the opt-in steps, illustrated in FIG. 11. If the phone number is opted-in, the system 10 then determines if the max number of message has been sent to the phone number in the last hour or not. If the max number has been sent, the system 10 may wait for the number of messages sent to the phone to be less than the max amount per hour. If the max has not been reached, the system 10 may determine if the max number of messages has been sent through the SMS gateway in the last hour. Again, if the max has been reached, the system 10 may wait for the number of messages sent through the SMS gateway to be less than the max per hour. Once the time has elapsed for both the max of messages to the phone number and the max amount through the SMS gateway, the system 10 determines whether the message contains one hundred sixty (160) characters or less. If the message contains more than one hundred sixty (160) characters, the message may be broken into multiple messages of one hundred sixty (160) characters or less before sending. Then the message is sent through the SMS gateway to the phone number.

In one embodiment, the database 44 includes a second user records list 114 (shown in FIGS. 14 and 15) that includes a plurality of user records 48. Each user record 48 includes a unique user profile 50. The unique user profile 50 can be an inmate profile 52 or a civilian profile 54. Each inmate profile 52 includes a unique user inmate user ID 56, a current account balance 58, at least one civilian or user account number 60, and a carrier 116. The at least one civilian account number 60 is associated with a civilian user ID 62. The civilian user ID 62 may also be a code word to help identify the civilian profile 54. Each civilian profile 54 includes a unique civilian user ID 62 associated with a corresponding civilian, a mobile ID 64 associated with a mobile computing device 20, at least one inmate account number 60, and a carrier 118. The unique inmate user ID 56 may be paired with more than one associated civilian mobile ID 64. For example, as shown in FIG. 14, Bob378 is paired with both associated mobile ID 123-456-7899 and mobile ID 987-654-3211. The unique civilian user ID 62 and the unique inmate user ID 56 include user identifying data such as, for example, a unique ID and/or password, and may also include user contact information such as, for example, a phone number, an e-mail, and/or a mobile device data associated with a mobile computing device 20 associated with the user. For example, the mobile device data may include, but is not limited to, the unique mobile device ID 64, operating system, phone number, IP address, mobile device API, a carrier 116/118, and/or any suitable information that enables the system 10 to communicate with the corresponding mobile computing device 20. The carrier 116/118 may also include a carrier ID 120. For example, the carrier 116 may be AT&T and the carrier ID 120 may be 123456. The carrier ID 120 is used to determine the specific user associated with the carrier ID 120. The data associated with the inmate account number 60 includes the inmate identifying data such as, for example, a unique ID and/or password and an account balance 58. Each inmate account number 60 is associated with a separate device 14 to facilitate the data between the system 10 and the civilian mobile user device 20.

In one embodiment, the database 44 includes the action event record list 66 (shown in FIG. 16) that includes the plurality of action event records 68. Each action event record 68 may include the triggering event 70, the action event data 72, and the action event 74. The system 10 may initiate the action event 74 once the action event 74 is triggered by the triggering event 70. By the action event 74 being triggered by the triggering event 70, the action event 74 may then send the action event 74 to the corresponding server, dependent on which action event 74 has been triggered. The action event data 72 includes information and data including, but is not limited to, determining whether the carrier 116/118 of the new user is an allowed carrier 124 or not, upon determining the new user carrier 116/118, send to either an allowed list 124 or a blocked list of carriers 126, send the new user information to a $3^{rd}$ party server 16 to determine the carrier 116/118, and convert the plurality of SMS messages into one MMS message. As shown in FIG. 16, the action event data 72 may include data associated with the corresponding action record. In one embodiment, the action event data 72, for example, Action010, includes information that enables the system 10 to determine whether the carrier 116/118 of the new user is an allowed carrier 124 or not. The triggering event data includes data associated with the triggering event 70 that includes an event or occurrence that may be detected by the system 10. The triggering events 70 may include, but are not limited to, to determine the carrier 116/118 of the new user, send the user profile 50 to an appropriate list 122, send received carrier 116/118 to $3^{rd}$ party server 16, receive SMS messages that includes a predetermined amount of characters, and receive a plurality of SMS messages. Once the system 10 initiates the triggering event 70, the triggering event 70 triggers the corresponding action event 74, which will send the action event data 72 to the corresponding server 34, 36, 38, 40, 42.

Figure 18:
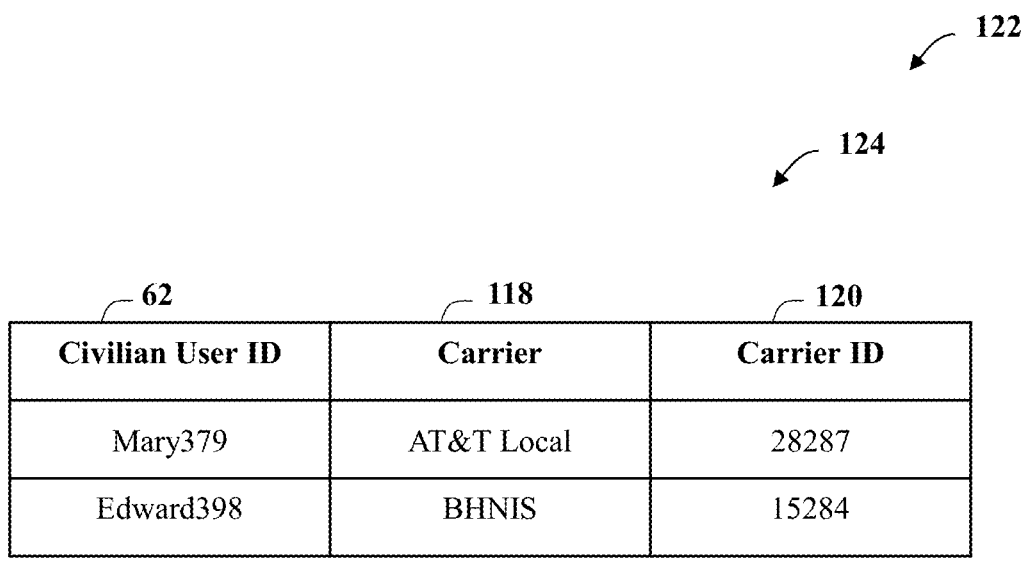
Figure 19:
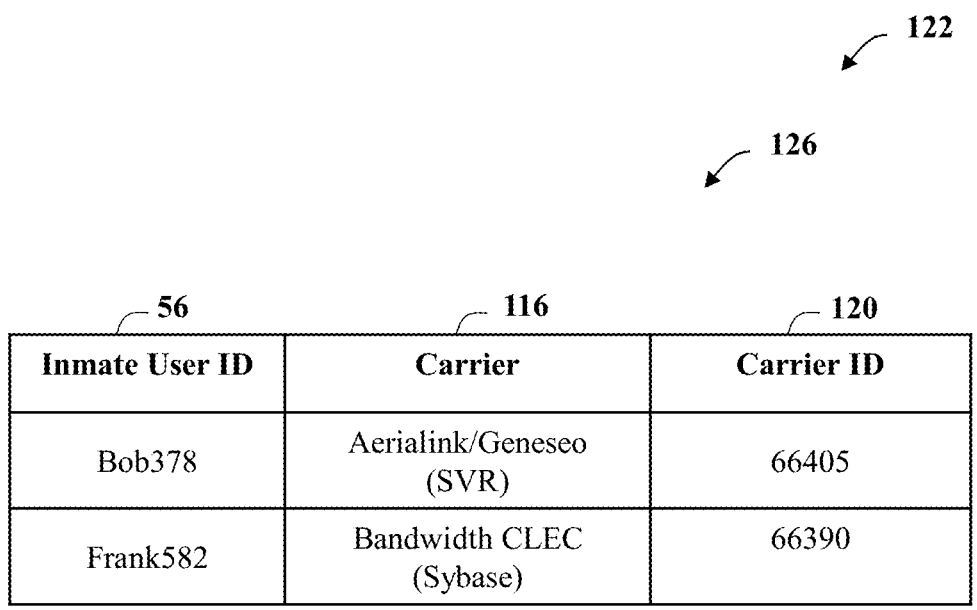

In the illustrated embodiment, the application server 38 is programmed to monitor activities associated with the plurality of user records 48 and process the messages being sent and received. The system 10 is configured to prevent correspondence between inmates that are using other carriers 118 from sending and receiving messages. For example, the system 10 may prevent inmates from sending and receiving messages from other inmates in different facilities. The system 10 for facilitating incoming and outgoing electronic messages includes the database 44 and the application server 38. The database 44 includes a plurality of user records 48. The user records 48 include a plurality of user profiles 50 which includes a plurality of civilian profiles 54 and a plurality of inmate profiles 52. Each of the user profiles 50 includes a user ID 62, a mobile ID 64 associated with a mobile device 20, a carrier 116, and at least one inmate account number 60, and each of the inmate profiles 52 includes an inmate user ID 56, a carrier 118, a current account balance 58, and at least one user account number 60. The application server 38 includes a processor programmed to receive a message from a new user profile 50, determine a carrier 116/118 of the user profile 50, process the user profile 50 based on the carrier 116/118, wherein the carrier 116/118 is determined by a triggering event 70, and send the user profile 50 to an appropriate list 122 for future messaging (as shown in FIGS. 18 and 19). The triggering event 70 includes receiving the specific carrier 116/118 of the user profile 50. Once the application server 38 receives the carrier 116/118, the user profile 50 may be placed into the appropriate list 122. The appropriate list 122 is programmed by the system 10 and separates the user profiles 50 based on the specific carrier 116/118. The appropriate list 122 includes an allowed carrier list 124 and a blocked carrier list 126. For example, an allowed carrier may be AT&T™, Verizon™, Century Link™, Cox Communications™ and/or Sprint™ and a blocked carrier may be another service that facilitates messages between inmates, such as, for example, Aerialink/Geneseo (SVR). The allowed carrier list 124 is further processed to allow incoming and outgoing messages through the system 10. The blocked carrier list 126 is further blocked from sending and receiving messages through the system 10 between current inmate profiles 52. The system 10 may use a $3^{rd}$ party server 16 to determine the carrier 116/118 of a new user profile 50.

In another embodiment, the application server 38 is programmed to detect the occurrence of triggering events 70 associated with the plurality of user records 48 and the messages being sent and received. In addition, the application server 38 may also be programmed to monitor the information associated with the $3^{rd}$ party server 16 including sending the new user profile 50 to the 3rd party server 16 to determine the carrier 116/118 and/or verification ID, described further below. The application server 38 may also be programmed to receive updates to user profiles 50 for use in determining whether the user has changed carriers.

The application server 38 may send a request or triggering event 70 to the external server 40 triggering an action event 74 from the external server 40 to determine the carrier 116/118 of the user profile 50. For example, in Action012 shown in FIG. 16, the application server 38 is configured to send the new user profile 50 to a $3^{rd}$ party server 16 to determine the new user carrier 116/118 and carrier ID 120.

In one embodiment, as shown in FIG. 16, the application server 38 is programmed to determine a carrier 116/118 of the new user. The application server 38 may determine the carrier 116/118 is using a $3^{rd}$ party server 16. Once the $3^{rd}$ party server 16 determines the carrier 116/118 of the new user, the application server 38 may receive the carrier 116/118 and place the new user profile 50 into the appropriate list 122. If the carrier 116/118 is an approved carrier, the user profile 50 may be placed on the approved list 124 and, if the carrier 116/118 is not an approved carrier, the user profile 50 may be placed on the blocked list 126. For example, as shown in FIG. 18, Mary379 has the carrier 116/118 AT&T™ Local, which is an allowed carrier. Mary379 is placed on the approved list 124 and is able to send messages to inmates and receive messages from inmates using the system 10.

Figure 20:
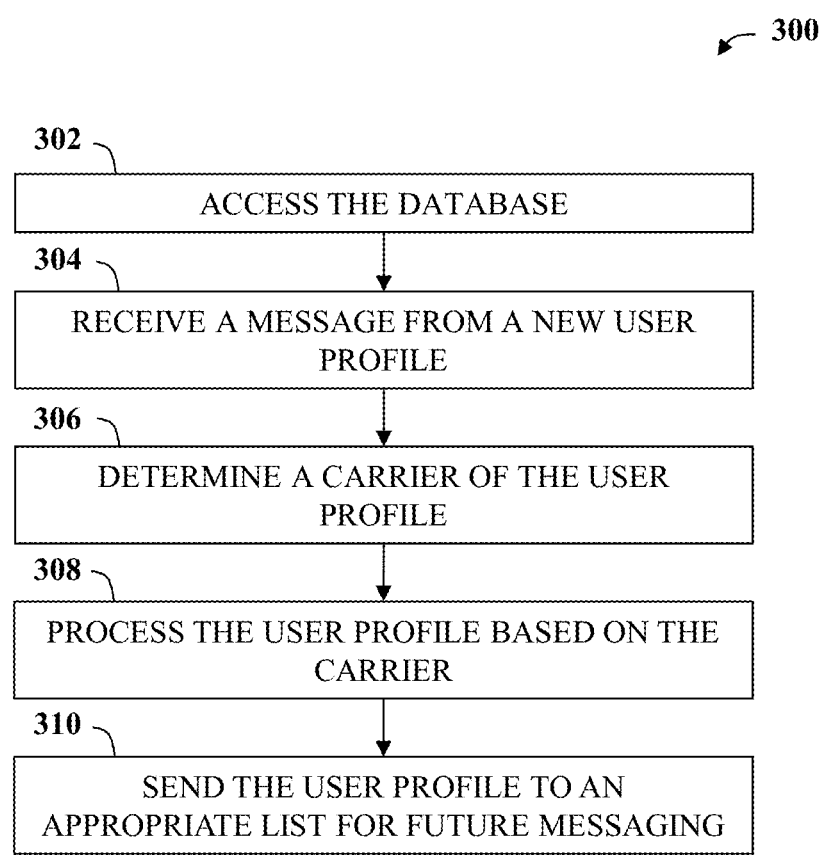
FIGS. 20-23, are flowcharts of methods, according to embodiments of the present invention that may be used with the system shown in FIG. 1.

Referring to FIG. 20, a flowchart of another embodiment of a method 300, according to the present invention, may be used with the system 10 for further facilitating incoming and outgoing electronic messages is described. The method 300 includes a plurality of steps. It should be appreciated that each method step may be performed independently of, or in combination with, other method steps. Portions of the method may be performed by any one of, or any combination of, the components of the system 10.

In method step 302, the application server 38 accesses the database 44 including a plurality of user profiles 50 which includes a plurality of civilian profiles 54 and a plurality of inmate profiles 52, wherein each of the civilian profiles 54 includes a user ID 62, a mobile ID 64 associated with a mobile device 20, a carrier 116, and at least one inmate account number 60, wherein each inmate profile 52 includes an inmate user ID 56, a carrier 118, a current account balance 58, and at least one user account number 60. In method step 304, the application server 38 receives a message from a new user profile 50. In method step 306, the application server 38 determines a carrier 116/118 of the user. In method step 308, the application server 38 processes the user profile 50 based on the carrier 116/118, wherein the carrier 116/118 is determined by a triggering event 70. In method step 310, the application server 38 sends the user profile 50 to an appropriate list 122 for future messaging.

In one embodiment, the system 10 blocks correspondence between users based on the carrier 116/118 of the user computing device 14. For example, some inmates try to communicate with other inmates in other facilities. The system 10 identifies the carrier 116/118 of the incoming message and blocks the message from being transmitted if the user is from another facility. The system 10 may use, for example, IP based phone numbers when trying to determine the carrier 116/118 of the user computing device 14.

In one embodiment, the system 10 receives a new phone number or new user either sending or receiving a message. The system 10 may then query the phone number to determine the carrier 116/118. The system 10 may use a $3^{rd}$ party server 16 to determine the carrier 116/118. The system 10 includes a list of allowed carriers 124 and a list of blocked carriers 126. For example, an allowed carrier may be AT&T™. The system 10 may then determine which list the new phone number is on and send the phone number to be placed on the appropriate list 122. If the new user is allowed, the user may send and receive messages, but if the user is blocked, the user is blocked from sending and receiving messages from other blocked users, for example other current inmates.

In another embodiment, the system 10 for facilitating incoming and outgoing electronic messages includes the database 44 having a plurality of user records 48 and an application server 38 including a processor. The user records 48 include a plurality of user profiles 50 and a plurality of inmate profiles 52. Each of the user profiles 50 includes a user ID 62, a mobile ID 64 associated with a mobile device 20, a carrier 116, and at least one inmate account number 60, and each of the inmate profiles 52 includes an inmate user ID 56, a carrier 118, a current account balance 58, and at least one user account number 60. The processor is programmed to receive a SMS message from a first user, determine whether the SMS message includes a predetermined amount of characters, break the SMS message into a plurality of SMS messages if the message includes the predetermined amount of characters, convert the plurality of SMS messages into a plurality of MMS messages, receive the plurality of MMS messages, wherein the plurality of MMS messages includes an image of the plurality of SMS messages, convert the plurality of MMS messages into a plurality of readable SMS messages, and send the plurality of readable SMS messages to a second user. The application server 38 may send the MMS message to a $3^{rd}$ party server 16 for conversion. The $3^{rd}$ party server 16 may be an optical character recognition system. The optical character recognition system reads the MMS messages from the original SMS message and converts the image to a text file or another SMS message in order to send the message to the second user.

In one embodiment, the system 10 converts messages that exceed a predetermined amount of characters from a SMS message to a MMS message. Some systems do not receive images and therefore cannot receive the MMS message from other users. The system 10 then converts the MMS message back into an SMS message. The system 10 may use optical character recognition (OCR) to convert the MMS message into a SMS message. The OCR may be able to read the photos and convert the image into a text to send to the other user. For example, a first user may send a message that exceeds the predetermined amount of characters. The system 10 may then break the message into multiple MMS messages to be sent to a second user. The second user may not be able to receive MMS messages and the MMS message may have to be converted back into a SMS message. The system 10 may then convert the multiple MMS messages into multiple SMS messages to be sent to the second user.

In one embodiment, in FIG. 17, the application server 38 is configured to convert the MMS message into a readable SMS message. The application server 38 may receive the MMS message from the application server 38. In order to send the MMS message to the user, the application server 38 may send the MMS message to the $3^{rd}$ party server 16 to be converted to a SMS message. The $3^{rd}$ party server 16 may use optical character recognition to detect the words within the MMS message and convert the image into the SMS message. The SMS message may then be sent to a user that may not be able to receive MMS messages. For example, as illustrated in FIG. 17, Mary379 sent a SMS message that exceeded the predetermined amount of characters. The message is then broken into a plurality of MMS messages of the SMS message. The receiving user may not be able to accept MMS messages, and the plurality of MMS messages may need to be converted into a plurality of SMS messages. The application server 38 recognizes the plurality of MMS messages and sends the plurality of MMS messages to the $3^{rd}$ party server 16 where the plurality of MMS messages are converted into a plurality of SMS messages. The plurality of SMS messages may now be sent to the receiving user. For example, inmates are not allowed to receive MMS messages. A user, civilian, may send a SMS message that exceeds the predetermined amount of characters. The message may then be converted into a MMS message. The application server 38 may then convert the MMS message into a SMS message to be sent to the inmate.

Figure 21:
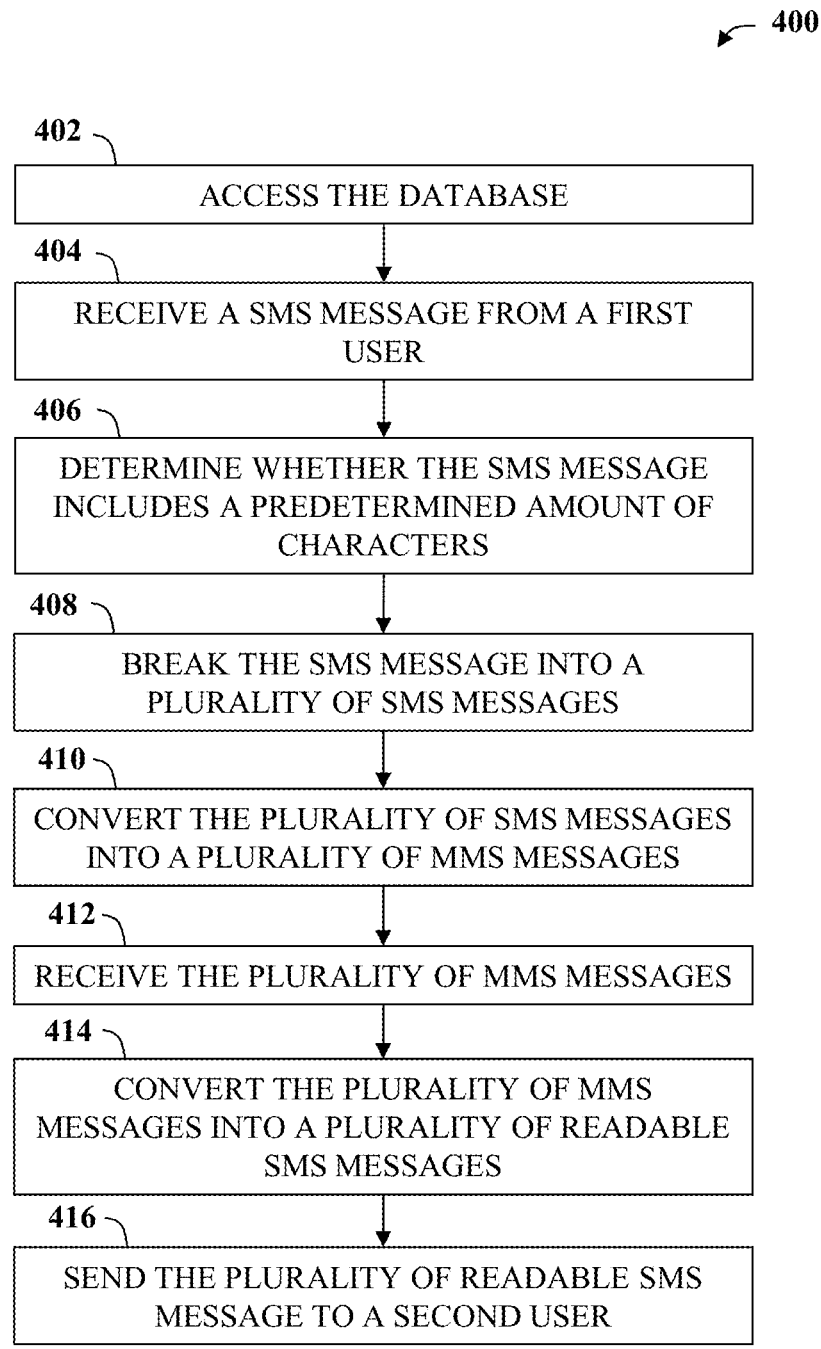

Referring to FIG. 21, a flowchart of yet another embodiment of a method 400, according to the present invention, that may be used with the system 10 for further facilitating incoming and outgoing electronic messages is described. The method 400 includes a plurality of steps. Each method step may be performed independently of, or in combination with, other method steps. It should be appreciated that portions of the method may be performed by any one of, or any combination of, the components of the system 10.

In method step 402, the application server 38 accesses the database 44 including a plurality of user profiles 50 and a plurality of inmate profiles 52, wherein each of the user profiles 50 includes a user ID 62, a mobile ID 64 associated with a mobile device 20, a carrier 116, and at least one inmate account number 60, wherein each inmate profile 52 includes an inmate user ID 56, a carrier 118, a current account balance 58, and at least one user account number 60. In method step 404, the application server 38 receives a SMS message from a first user. In method step 406, the application server 38 determines whether the SMS message includes a predetermined amount of characters. In method step 408, the application server 38 breaks the SMS message into a plurality of SMS messages if the message includes the predetermined amount of characters. In method step 410, the application server 38 converts the plurality of SMS messages into a plurality of MMS messages. In method step 412, the application server 38 receives the plurality of MMS messages, wherein the plurality of MMS messages includes an image of the plurality of SMS messages. In method step 414, the application server 38 converts the plurality of MMS messages into a plurality of readable SMS messages. In method step 416, the application server 38 sends the plurality of readable SMS messages to a second user. In addition, the MMS message may be sent to a 3$^{rd}$ party server 16 for further converting the MMS message into a SMS message. The 3$^{rd}$ party server 16 may be an optical character recognition system.

In various embodiments, the application software provides the system 10 with a platform to allow civilians and inmates to send rich communication service messages (RCS) back and forth on a secure network without burning out the system 10 using multiple SIM cards/phone numbers. In facilitating the RCS messaging, the system 10 is similar to the system of sending messages back and forth as described above.

In one embodiment, the system 10 for facilitating incoming and outgoing rich communication service messages (RCS) includes a database 44 and an application server 38. The database 44 includes a plurality of user records 48. The user records 48 include a plurality of unique user profiles 50 which includes both a plurality of civilian profiles 54 and a plurality of inmate profiles 52. Each of the civilian profiles 54 includes a user ID 62, a mobile ID 64 associated with a mobile device 20, a carrier 118, and at least one inmate account number 60, wherein each of the inmate profiles 52 includes an inmate user ID 56, a carrier 116, a current account balance 58, and at least one user account number 60. The application server 38 includes a processor that is programmed to receive a RCS message from a new user profile 52/54, determine a carrier 116/118 of the new user profile 52/54, process the new user profile 52/54 based on the carrier 116/118, and send the new user profile 52/54 to an appropriate list 122 for future RCS messaging. The carrier 116/118 may be determined by a triggering event. The appropriate list 122 may include an allowed carrier list 124 and a blocked carrier list 126, as described above. The allowed carrier list 124 is allowed to receive and send RCS messages. The blocked carrier list 126 is not allowed to send and receive RCS messages. The carrier 116/118 is determined using a 3$^{rd}$ party service, as described above.

Figure 22:
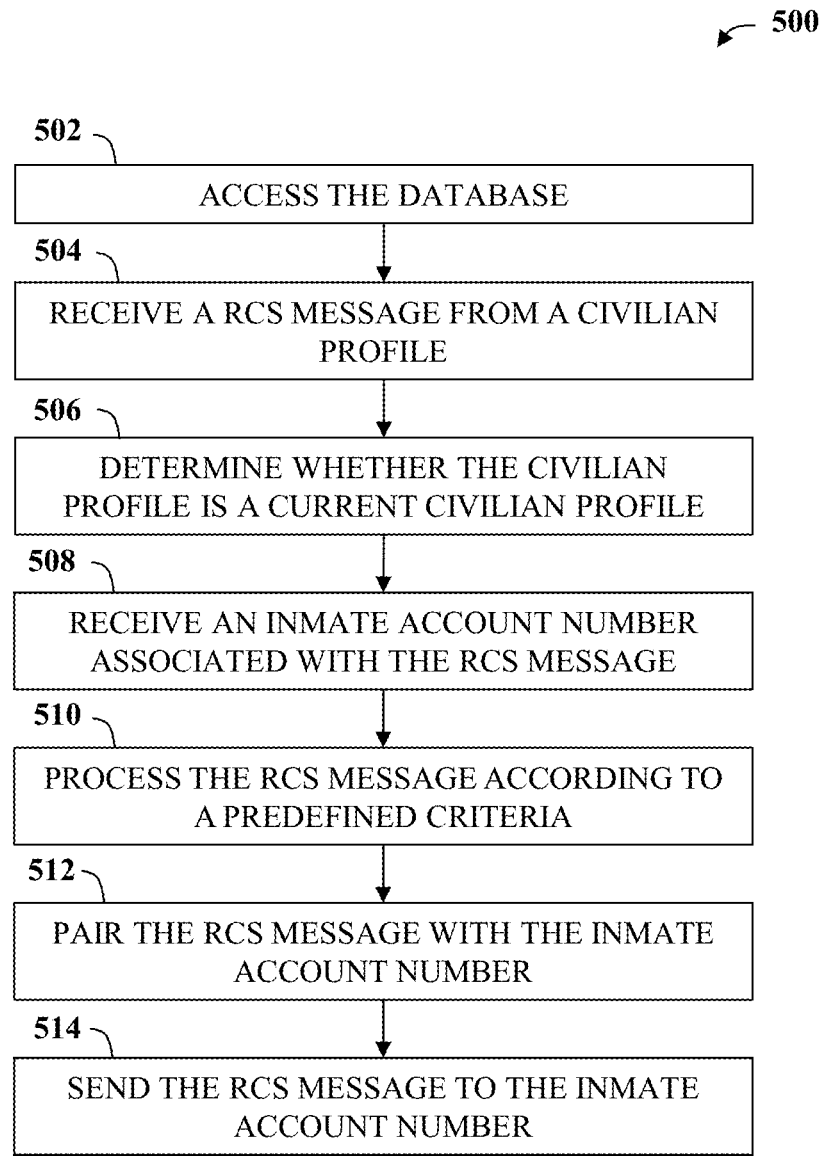

Referring to FIG. 22, a flowchart of one embodiment of a method 500, according to the present invention, that may be used with the system 10 for providing controlled communications between inmates and civilians. The method 500 includes a plurality of steps. Each method step may be performed independently of, or in combination with, other method steps. Portions of the method may be performed by any one of, or any combination of, the components of the system 10.

In method step 502, the application server 38 accesses the database 44 that includes a plurality of user profiles 50. The plurality of user profiles 50 includes a plurality of civilian profiles 54 and a plurality of inmate profiles 52. Each civilian profile 54 includes a civilian user ID 62, a mobile ID 64 associated with a mobile device 20, and at least one inmate account number 60. Each inmate profile 52 includes an inmate user ID 56, a current account balance 58, and at least one user account number 60. In method step 504, the application server 38 is configured to receive a rich communication service (RCS) message from one of the civilian profiles 54.

In method step 506, the application server 38 is configured to determine whether the civilian profile 54 is a current civilian profile 54. The RCS message may be received from a non-current civilian profile 54. In one embodiment, the application server 38 receives a RCS message from a non-current civilian profile 54. The application server 38 sends a second RCS message to the non-current civilian profile 54. The second RCS message requests the inmate account number 60 to be associated to the non-current civilian profile 54. The application server 38 receives the inmate account number 60 to be associated with the non-current civilian profile 54 and the application server 38 may send information to the database 44 to mark the non-current civilian profile 54 as a current civilian profile 54.

Further, in method step 508, the application server 38 is configured to receive an inmate account number 60 associated with the RCS message. The application server 38 determines whether the current civilian profile 54 is associated with more than one inmate account number 60. The application server 38 receives from the database 44 the inmate account number 60 that is associated with the current civilian profile 54. Then, the application server 38 determines the inmate account number 60 that is associated with the RCS message received.

In method step 510, the application server 38 processes the RCS message received from the civilian user ID 62. The RCS messages must meet a predefined criteria 84. The predefined criteria 84 includes a predetermined amount of RCS messages to be sent in a predetermined amount of time, a predetermined amount of characters included in the RCS message, at least one emoticon, and at least one image.

In one embodiment, the application server 38 determines the predetermined amount of RCS messages to be sent in the predetermined amount of time and determines whether the RCS message includes the predetermined amount of characters included in the RCS message. Once the RCS message includes the predetermined amount of characters, the application server 38 removes the at least one emoticon from the RCS message and/or removes the at least one image from the RCS message.

In another embodiment, the application server 38 breaks the RCS message into a plurality of RCS messages if the RCS message includes the predetermined amount of characters. In addition, the application server 38 holds onto the RCS message if the predetermined amount of RCS messages to be sent in the predetermined amount of time has been exceeded. In method step 512, the application server 38 pairs the RCS message with the inmate account number 60.

In yet another embodiment, the application server 38 determines whether the inmate account balance 58 is paid for or is outstanding. If the account balance 58 is not paid, the application server 38 may hold onto the RCS message until the account balance 58 is up-to-date. The application server 38 sends a third RCS message to the civilian profile 54 if the account balance 58 is not up-to-date. The application server 38 may receive a payment from the civilian profile 54 to pay for the inmate account balance 58. Once the account is paid for, or up to date, the application server 38 sends the RCS message to the inmate once the account balance 58 has been paid. In method step 514, the application server 38 sends the RCS message to the inmate account number 60.

In another embodiment, the application software provides the system 10 with a platform to allow civilians and inmates to send video communications back and forth on a secure network without burning out the system 10 using multiple SIM cards/phone numbers. In facilitating the video communications, the system 10 is similar to the system of sending messages back and forth as described above.

In one embodiment, the database 44 includes a third user records list 130 (shown in FIGS. 24 and 25) that includes a plurality of user records 48. Each user record 48 includes a unique user profile 50. The unique user profile 50 can be an inmate profile 52 or a civilian profile 54. Each inmate profile 52 includes a unique user inmate user ID 56, a current account balance 58, at least one user account number 60, and a video communication schedule 132. The at least one user account number 60 is associated with a civilian user ID 62. The civilian user ID 62 may also be a code word to help identify the civilian profile 54. Each civilian profile 54 includes a unique civilian user ID 62 associated with a corresponding civilian, a device ID 64 associated with a device 14, at least one inmate account number 60, and a video communication schedule 132. The unique civilian user ID 62 and the unique inmate user ID 56 include user identifying data such as, for example, a unique ID and/or password, and may also include user contact information such as, for example, a phone number, an e-mail, and/or a mobile device data associated with a mobile computing device 20 associated with the user. In addition, the unique civilian user ID 54 may include user contact information associated with a device 14, such as, for example a computer or a tablet. For example, the mobile device data may include, but is not limited to, the unique mobile device ID 64, operating system, phone number, IP address, mobile device API, and/or any suitable information that enables the system 10 to communicate with the corresponding mobile computing device 20. In addition, the device data may include, but is not limited to, the unique device ID 64, operating system, IP address, and/or any suitable information that enables the system 10 to communicate with the corresponding device 14. The data associated with the inmate account number 60 includes the inmate identifying data such as, for example, a unique ID and/or password and an account balance 58. Each inmate account number 60 is associated with a separate device to facilitate the data between the system 10 and the civilian mobile user device 20 or the civilian user device 14.

Figure 26:
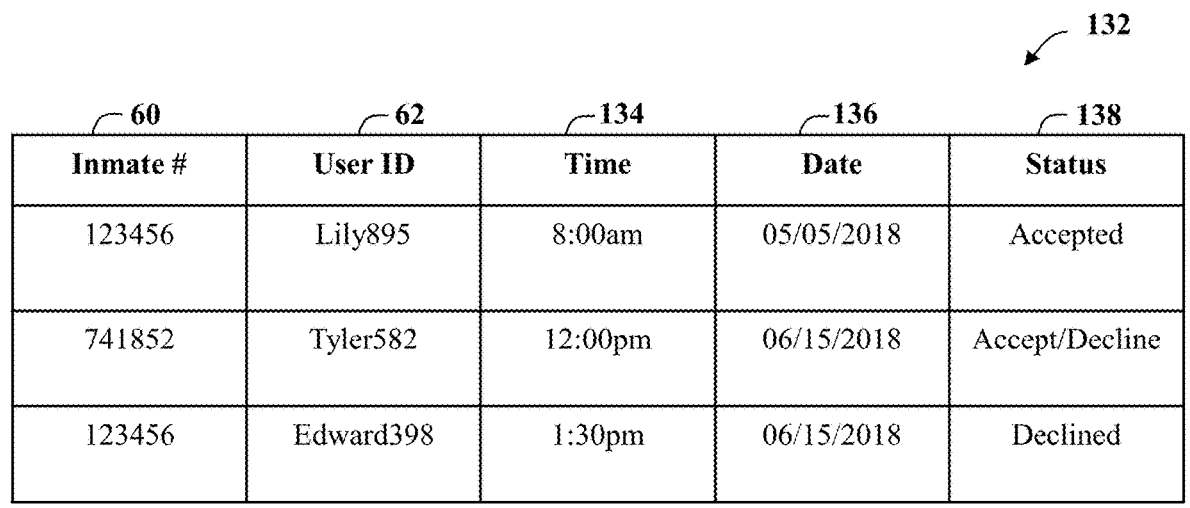

In addition, the video communication schedule 132, as shown in FIG. 26, may include the associated inmate account number 60, the user ID 62, the predetermined time 134, the predetermined date 136, and the status 138. The video communication schedule 132 is updated as the application server 38 receives video communication requests 128. The predetermined time 134 may include any time during visiting hours of the inmate location. For example, the inmate location may allow visitations from 10:00 am until 2:00 pm. The user ID 62 associated with the inmate account number 60 may only participate in a video communication after the user ID 62 has been approved by the system 10 and during visitation hours of the inmate location. The location of the inmate may be determined by the carrier 116. For example, inmate carrier 116 includes but is not limited to Aerialink/Geneseo (SVR). The system 10 may determine whether the carrier 116/118 is associated with a current inmate or a current civilian, as described in more detail above. The predetermined date 136 may include any date where visitations are allowed at the inmate location. For example, the inmate location may not allow visitations on specific holidays, such as, Christmas, 4$^{th}$ of July, Labor Day, etc. The status 138 of the video communication request 128 may include an open request and/or a pending request (where the request has not been answered) 140, an accepted request 142, and a declined request 144. Once the user (inmate or civilian) answers (messaging information 80) the video communication request 128, the video communication schedule 132 may update the status 138 due to a triggering event 70.

In one embodiment, the database 44 includes the action event record list 66 (shown in FIG. 27) that includes a plurality of action event records 68. Each action event record 68 may include a triggering event 70, action event data 72, and the action event 74. The system 10 may initiate the action event 74 once the action event 74 is triggered by the triggering event 70. By the action event 74 being triggered by the triggering event 70, the action event 74 may then send the action event 74 to the corresponding server, dependent on which action event 74 has been triggered. Action event data 72 includes information and data including, but is not limited to, determining whether the message contains a video communication request 128 for a profile associated with the profile that sent the message, sending the message to the associated profile, receiving an answer to the video communication request 128, where the answer includes a yes or a no to the video communication request 128, and establish the video communication between the associated profiles at a predetermined time 134. As shown in FIG. 27, the action event data 72 description may include data associated with the corresponding action record. For example, in one embodiment, the action event data 72, Action023, includes information that enables the system 10 to receive an answer that includes a yes or a no to the video communication request 128, which will be sent back to the profile that originally sent the video communication request 128. The triggering event data includes data associated with the triggering event 70 that includes an event or occurrence that may be detected by the system 10. The triggering events 70 may include, but are not limited to, requests and/or signals received by the user computing device 14, for example, the civilian profile 54 may send a message including a video communication request 128, an answer to the video communication request 128, and a predetermined time 134 for the video communication request 128. Once the system 10 initiates the triggering event 70, the triggering event 70 triggers the corresponding action event 74, which will send the action event data 72 to the corresponding server.

The database 44 may also include the user action record list 76 (shown in FIG. 28) that includes a plurality of user action records 78 that are associated with a plurality of users. Each user action record 78 includes the user record 48 associated with the corresponding user ID 56/62, the action record ID 68, the triggering event 70, and action event data 72. In addition, the user action record 78 may also include messaging information 80 having data and information to be sent with a mobile computing device 20 associated with the corresponding user profile 52/54 and/or API information associated with the corresponding mobile computing device 20. In one embodiment, the messaging information 80 may also include contact information such as, for example, emails, and/or text, and phone numbers. The application server 38 may identify one or more additional users that may receive notifications generated by the website hosting server 34 and include contact information associated with the identified additional users in the messaging information 80 that has sent or received a message using the system 10.

In one embodiment, the application server 38 is configured to receive a message from a first profile. The application server 38 determines the information contained in the message, for example, a video communication request 128. The video communication request 128 may be associated with a second profile. The second profile may be associated, as described above, with the first profile that originally sent the message including the video communication request 128. For example, as illustrated in FIG. 28, Lily895 sent a message including a video communication request 128 to Bob378. Bob378 may either reject or accept the video communication request 128. The video communication request 128 includes a predetermined time 134 and date 136. If Bob378 accepts the video communication request 128, the predetermined time 134 and date 136 may be placed in Bob378's user profile, as shown in FIG. 26. In addition, the video communication schedule 132 for both Bob378 and Lily895 may be updated, such as, the status 138 for the video communication request 128 will change from pending to accepted. For example, if Bob378 accepts the video communication request 128 from Lily895, the accepted video communication 142 may be placed on both Bob378 and Lily895's schedule. The video communication schedule 132 includes the inmate associated account number 60, the civilian user ID 62, inmate location, predetermined time 134, predetermined date 136, and status 138 of the video communication request 128.

Figure 23:
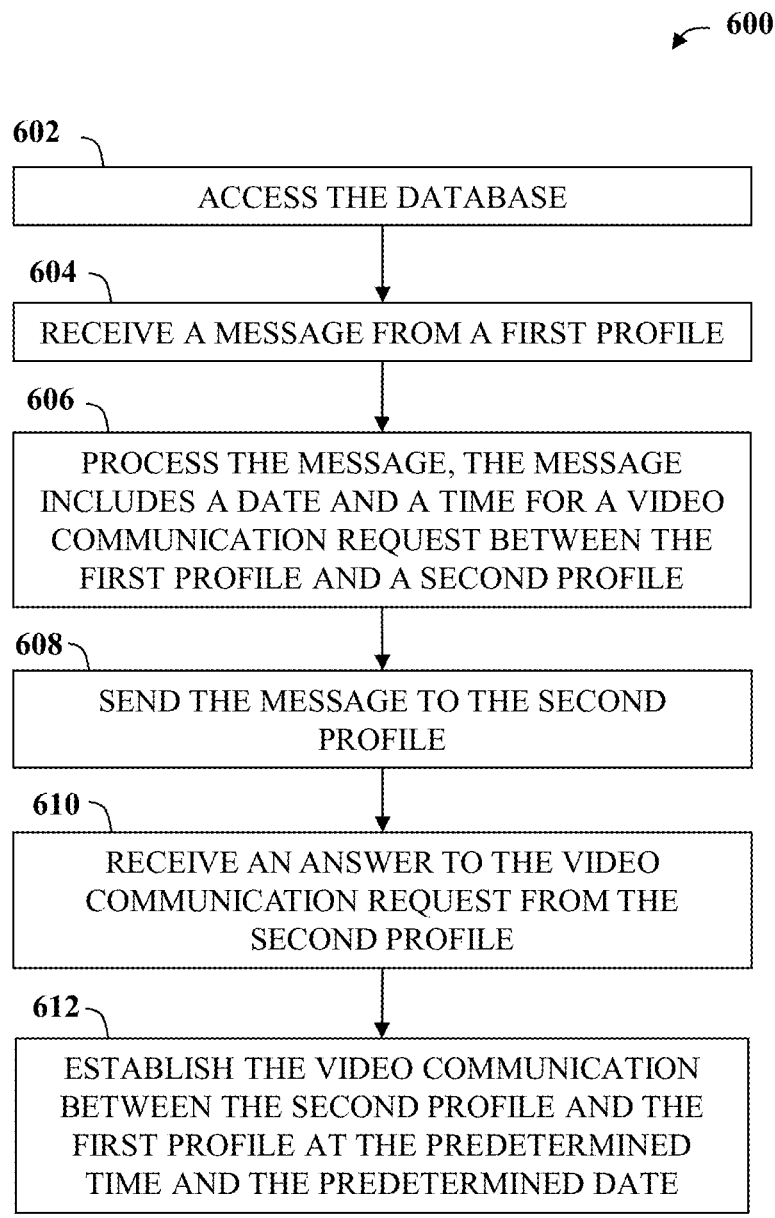

Referring to FIG. 23, a flowchart of yet another embodiment of a method 600, according to the present invention, that may be used with the system 10 for facilitating a video communication between a first user and a second user. The method 600 includes a plurality of steps. Each method step may be performed independently of, or in combination with, other method steps. It should be appreciated that portions of the method may be performed by any one of, or any combination of, the components of the system 10.

In method step 602, the application server 38 accesses the database 44 including a plurality of user profiles 50 and a plurality of inmate profiles 52, wherein each of the user profiles 50 includes a user ID 62, a device ID 64 associated with a device 14, a carrier 118, and at least one inmate account number 60, wherein each inmate profile 52 includes an inmate user ID 56, a carrier 116, a current account balance 58, and at least one user account number 60.

In method step 604, the application server 38 receives a message from a first profile. The first profile may be a user profile 50 or an inmate profile 52. The message contains a video communication request 128 for a second profile associated with the first profile. The second profile may be the user profile 50 or the inmate profile 52.

In method step 606, the application server 38 processes the message including the video communication request 128. The message includes a predetermined time 134 and a predetermined date 136 for establishing a video communication between the second profile and the first profile.

In method step 608, the application server 38 sends the message to the second profile. In method step 610, the application server 38 receives an answer to the video communication request 128 from the second profile. The answer may be an acceptance of the video communication request 128 or a decline to the video communication request 128. In addition, the second profile may suggest a new predetermined time 134 and/or date 136 if the first time and date does not work for the second profile. The application server 38 may then send a message back to the first profile with the new predetermined time 134 and/or date 136.

In method step 612, the application server 38 establishes the video communication between the second profile and the first profile at the predetermined time 134 and date 136. The video communication may be established between the first profile and the second profile immediately. In addition, the predetermined time 134 and the predetermined date 136 may occur a period of time after the video communication request 128 was sent from the first profile to the second profile. For example, the video communication request 128 may be sent on Monday at 8:00 am but the predetermined time 134 and the predetermined date 136 is set for Friday at 11:00 am.

In various embodiments, the system 10 provides a platform to verify the identity of users associated with current civilian profiles 54, current inmate profiles 52, and new user profiles 50. More specifically, the system 10 verifies the identity of users logging into current civilian profiles 54 and inmate profiles 52. In addition, the system 10 may verify the identity of the user creating a new user profile 50. The system 10 may verify the identity of the users prior to allowing messages to be sent between civilian profiles 54 and inmate profiles 52. Current systems rely on the honor system. For example, current systems believe the civilian user that logged into the civilian profile 54 is the civilian user associated with the civilian profile 54.

The system 10 for verifying the identity of the civilian user of the civilian profile 54 and the identity of the inmate user of the inmate profile 52 for messaging is not limited to verifying the identity of users using SMS or RCS messaging. The system 10 may be used with IP based messaging systems and any other systems inside institutional facilities that inmate users use to communicate with civilian users. In one embodiment, the system 10 may be used with other messaging systems for verification of the identity of the civilian users of the civilian profiles 54 messaging with the inmate users of the inmate profiles 52. For example, the system 10 may use Facebook API to verify the identity of the civilian user that logged into the civilian profile 54.

In one embodiment, the system 10 for verifying the identity of users associated with user profiles for messaging between civilian profiles 54 and inmate profiles 52 includes a database 44 and an application server 38. The database 44 includes a plurality of user records 48. The database 44 includes a plurality of user profiles 50. The application server 38 includes a processor that is programmed with an algorithm to receive a message 80 from a user associated with a user profile 50/52/54. The user may be associated with a civilian profile 54, an inmate profile 52, or a new user profile 50. The message 80 includes a verification ID 146. The verification ID 146 may include, but is not limited to, a name, a username, a phone number, an e-mail address, a photo, a fingerprint, or a separate account, for example, such as a Facebook™ or Instagram™ account. The processor is further programmed with an algorithm to hold the message 80 for verification of the identity of the user associated with the user profile 50/52/54, verify the identity of the user associated with the user profile 50/52/54 via the verification ID 146, allow a communication with the verified user associated with the user profile 50/52/54, and send the verified user associated with the user profile 50/52/54 to an appropriate list 122 for future messaging.

The appropriate list 122 includes a verified user list 148 and a non-verified user list 150. For example, a verified user profile 50/52/54 on the verified user list 148 is allowed to communicate with a desired user profile 50/52/54. However, a non-verified user profile on the non-verified user list 150 is not allowed to communicate with a user profile until the user profile 50/52/54 has been verified. The verified user list 148 is further processed to allow incoming and outgoing messages 80 through the system 10. The non-verified user list 150 is further blocked from sending and receiving messages 80 through the system 10 between the current inmate profiles 52 and the current civilian profiles 54. The system 10 may use a $3^{rd}$ party server 16 to verify the new user profile 50.

In one embodiment, the system 10 may need to re-verify the identity of the civilian user logged into the civilian profile 54 after a predetermined period of time 152 in order for the civilian user to continue to communicate with the matched inmate profile 52. For example, the predetermined period of time 152 may be, for example, one hour and after one hour of communication, the identity of the civilian user associated with the civilian profile 54 is re-verified via the system 10. The predetermined period of time 152 may be up to one day, ten hours, five hours, one hour, thirty minutes, fifteen minutes, etc. In another embodiment, the system 10 may re-verify the identity of the inmate user logged into the inmate profile 52 after a predetermined period of time 152 in order for the inmate user to continue to communicate with the matched civilian profile 54.

In another embodiment, the application server 38 is further programmed with an algorithm to match the verification ID 146 to a current user profile 52/54. The current user profile 52/54 may include the verification ID 146 described subsequently. If the current user profile 52/54 does not include the verification ID 146, the system 10 may send a message 80 to the current user profile 52/54 to receive the verification ID 146. For example, the application server 38 is programmed with an algorithm to send the message 80 to the user profile 50/52/54 before or after receiving the message 80 from the user profile 50/52/54. Once the user associated with the user profile 50/52/54 sends the message 80 back in response to the message 80 from the system 10, the system 10 may acquire the verification ID 146 via the message 80 sent back to identify the user of the user profile 50/52/54.

In one embodiment, the message 80 sent may be used to verify the identity of the new user profile 50 by acquiring a verification ID 146. The message 80 may be sent to the new user profile 50 and once the new user profile 50 sends a message 80 back, the system 10 may receive the verification ID 146 associated with the new user profile 50. For example, the message 80 may include, but is not limited to, a caller ID name and phone number. The name and phone number may be used to create the new user profile 50 and the verification ID 146. When the new user tries to log into the system 10 again, the system 10 may verify the identity of the new user via the caller ID name and phone number associated with the new user profile 50 (now current user account 54).

In one embodiment, the system 10 may use CNAM to verify the identity of the user of the new user profile 50 and/or the current user profile 52/54. The verification ID 146 is received via caller ID name (CNAM). For example, CNAM includes using two user-facing identifiable pieces of information when a phone call is made, usually a phone number and a Caller ID Name (a 15-character string). The CNAM results provide the name of the user registered to the phone number received. The results come directly from the carrier 116/118 for the phone number so the name associated with the phone number is accurate. The system 10 uses the API to query the results. However, there are some restrictions on when the results may be queried. In one embodiment, the results may only be queried on incoming calls or text messages. The name and phone number, verification IDs 146, received are then used to verify the identity of the user who sent the text message. For current user profiles 52/54, the system 10 may determine whether the name and phone number received match the name and phone number associated with the current user profile 52/54. For new user profiles 50, the system 10 may set-up a new user account discussed above.

In another embodiment, before correspondence between the inmate user associated with the inmate profile 52 and the civilian user associated with the civilian profile 54 occurs, the system 10 may send the message 80 to the civilian user to see if the civilian user would like to correspond with the inmate user. Once the civilian user responds that they want to correspond, the system 10 may grab the verification ID 146 associated with the message 80 sent and match the verification ID 146 with the current civilian profile 54. In one embodiment, the inmate user may be verified via the message 80 similar to the civilian profile 54.

In yet another embodiment, the verification ID 146 is received via phone append (RPA). For example, RPA is a service similar to CNAM except RPA does not pull the data directly from the carrier 116/118 but rather pulls the data from the third party server 16. The third party server 16 receives data from third party databases of stored data. In one embodiment, the data may be pulled from the user profile 50/52/54 using Facebook™ or Facebook™ API. In another embodiment, the data may be pulled from the user profile 50/52/54 using Instagram™ or Instagram™ API. The system 10 may retrieve photos from the Facebook™ or the Instagram™ account. For example, the third party server 16 may receive the photo associated with the Instagram™ account.

In one embodiment, the verification ID 146 is received via a live photo 156. The system 10 may require the civilian user and/or inmate user associated with the user profile 52/54 to take the live photo 156 with the mobile device 20 such as with the camera 24. In addition, the system 10 may require the civilian user and/or the inmate user to take the live photo 156 with the user computing device 14 via the camera 24. The system 10 may then take the image and identify the civilian user or inmate user using facial recognition. The system 10 may then match the live photo 156 with the verification ID 146 associated with the user profile 52/54.

In another embodiment, the live photo 156 is a current photo taken of the user. In yet another embodiment, the live photo 156 is a current photo taken of a government ID 158. The system 10 may allow the current civilian user or new civilian user to take a photo of a government-issued ID 158 along with the live photo 156. The live photo 156 may be a selfie taken by the inmate user and/or the civilian user on the mobile device 20. The system 10 may then send the photo to the third party server 16 for facial recognition to verify the identity of the user. The identification of the civilian user is then verified with the current civilian profile 54. For example, the civilian user may take a selfie, send the selfie to the system 10, the system 10 may then send the selfie to a third party server 16 to verify the user and compare the selfie to the photo associated with the current civilian profile 54. In another embodiment, the system 10 does not send the photo to the third party server 16 for verification and verifies the verification ID 146 by matching the photo with the current civilian profile 54. In addition, the system 10 may use optical character recognition (OCR) to extract information from the government ID 158. The government ID 158 may include, but is not limited to, a photo, a name, eye color, and/or an address to help the system 10 verify the identity of the user associated with the user profile 50/54.

In one embodiment, the system 10 may check the text or data of the messages 80 to and from the civilian profiles 54 for keywords to give the system 10 an idea of the identity of the civilian user communicating with the inmate profile 52. For example, if the inmate user says, "Hi Tom", the system 10 may capture the name "Tom" which indicates the inmate user is talking with "Tom". The system 10 may use this information in conjunction with other data received about the civilian user communicating with the inmate user to get an idea of who the civilian user really is that is communicating with the inmate user. The system 10 may then verify that the inmate user is communicating with a civilian profile 54 associated with the name "Tom". In addition, the system 10 may detect messages from the civilian user to the inmate user which include features to help verify the identity of the user associated with the user profile 52/54. For example, if the civilian user says, "Hi Steve", the system 10 may capture the name "Steve" which indicates the civilian user is talking with "Steve". The system 10 may use OCR to extract the information from the messages 80 between user profiles 52/54. In one embodiment, the system 10 may re-verify the identities of the users communicating during messaging after the predetermined period of time.

In another embodiment, the system 10 may use reverse e-mail to receive the verification ID 146. For example, the system 10 may receive the e-mail address associated with the civilian profile 54 and search, via the third party server 16, thousands of sources across social networks, accounts, profiles, and e-mail profiles to find as many profiles associated with the particular e-mail address as possible to receive the verification ID 146. In yet another embodiment, the system 10 may receive the verification ID 146 from the e-mail header information. For example, if the civilian profile 54 is associated with the e-mail address stevedoe@gmail.com, the system 10 may determine that the user's name is "Steve Doe". The system 10 may receive the name associated with the e-mail account as well as the IP address from where the e-mail was sent to the system 10. It should be appreciated that this information may help the system 10 verify the identity of the civilian user and/or locate the civilian user associated with the civilian profile 54.

In one embodiment, the system 10 may receive the verification ID 146 via payment information. For example, when the civilian user uses PayPal™ or another payment gateway, the system 10 may collect information including, but not limited to, the name and address of the civilian user associated with the civilian profile 54.

In another embodiment, the system 10 may receive the verification ID 146 via biometrics such as a fingerprint scan via the mobile device 20. For example, the mobile device 20 may receive the fingerprint to log-in to the mobile device 20 via the sensors including, but not limited to, the touch ID fingerprint sensor coupled to the input button 30. The system 10 receives the fingerprint to identify the civilian user by comparing the fingerprint, or verification ID 146, received to the verification ID 146 associated with the civilian profile 54. In addition, the system 10 may receive the verification ID 146 via a facial scan via the mobile device 20 which is sent to a third party server 16 for facial recognition.

In yet another embodiment, the live photo 156 is of a still photo of a recorded video 160. The system 10 may receive the video 160 in real time and capture the live photo 156 from the video 160. For example, the system 10 may receive the video 160 of a passport, front and back, and, once the video 160 is received, the system 10 may take a snap shot of the passport. The snap shot may include a verification ID 146 taken from the passport. The system 10 may use OCR to extract the data from the live photo 156 of the passport.

In another embodiment, the verification ID 146 is received via a barcode and/or MRZ scanner to obtain the verification ID 146. The third party server 16 may include the MRZ scanner which may allow the system 10 to integrate passport information and/or scan ID documents to extract data. The MRZ scanner is able to retrieve verification data from a document, for example, but not limited to, the government issued ID 158 or a passport.

Figure 29:
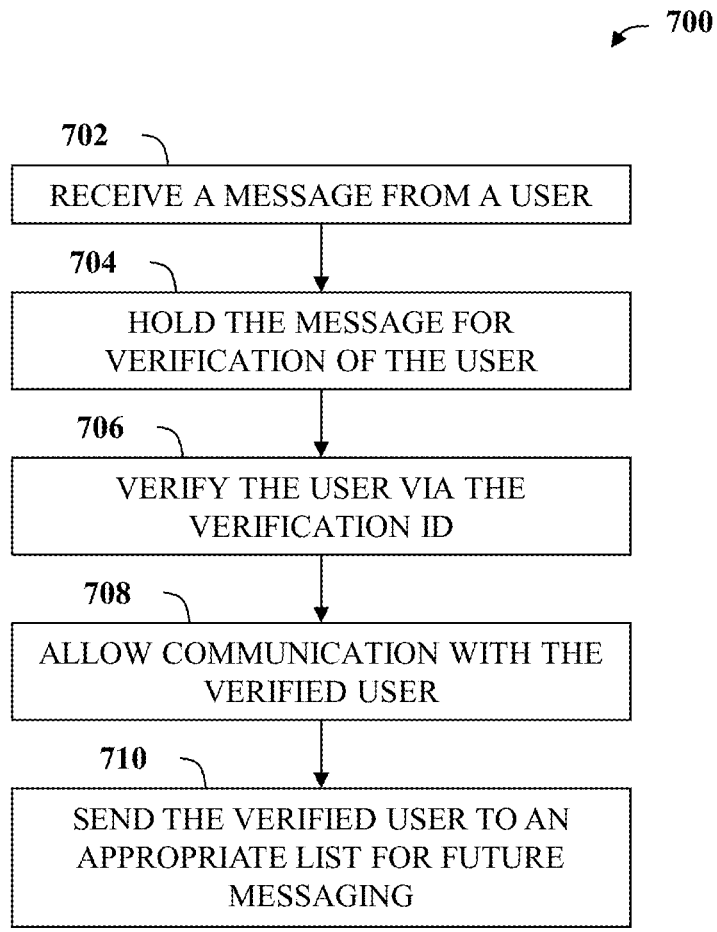
FIG. 29 is a flowchart of a method, according to one embodiment of the present invention that may be used with the system shown in FIG. 1.

Referring to FIG. 29, a flowchart of one embodiment of a method 700, according to the present invention, is shown that may be used with the system 10 for verifying users for messaging between the civilian users 54 and the inmate users 52. The method 700 includes a plurality of steps. Each method step may be performed independently of, or in combination with, other method steps. Portions of the method may be performed by any one of, or any combination of, the components of the system 10. It should be appreciated that the method 700 is performed by one or more algorithms.

In method step 702, the application server 38 receives the message 80 from a user associated with a user profile 50/52/54. The message 80 includes the verification ID 146. The verification ID 146 may include, but is not limited to, a name, a username, a phone number, an e-mail address, a photo, a government ID, a passport, video communication, a fingerprint, or a separate account, such as a Facebook™ or Instagram™ account.

In method step 704, the application server 38 holds the message 80 for verification of the identity of the user associated with the user profile 50/52/54. As the system 10 is verifying the identity of the user, the application server 38 may hold the message 80 until the user profile 50/52/54 is verified. In method step 706, the application server 38 verifies the identity of the user associated with the user profile 50/52/54 via the verification ID 146. The application server 38 may match the verification ID 146 with a current user profile 52/54 or use the received verification ID 146 to verify the user profile 50/52/54 using, but not limited to, CNAM, RPA, photo ID, and/or e-mail address.

In method step 708, the application server 38 allows a communication with the verified user profile 50/52/54. Once the identity of the user who sent the message 80 is verified, the system 10 may allow communication between the verified user and the matched profile 50/52/54, described above. In method step 710, the application server 38 sends the verified user profile 50/52/54 to an appropriate list 122 for future messaging. After the predetermined period of time 152, the system 10 may need to re-verify the identity of the user associated with the user profile 50/54 in order to continue to communicate with the matched inmate profile 52.

In one embodiment, the database 44 includes a fourth user records list 162 (shown in FIGS. 30 and 31) that includes a plurality of user records 48. Each user record 48 includes the unique user profile 50. The unique user profile 50 may be the inmate profile 52 or the civilian profile 54. Each inmate profile 52 includes, but is not limited to, a unique user inmate ID 56, a current account balance 58, at least one user account number 60, and a verification ID 146. The at least one user account number 60 is associated with a civilian user ID 62. The civilian user ID 62 may also be a code word to help identify the civilian profile 54. Each civilian profile 54 includes, but is not limited to, a unique civilian user ID 62 associated with a corresponding civilian, a device ID 64 associated with the device 14 being used to communicate with the inmate profile 52, at least one inmate account number 60, and a verification ID 146. The unique civilian user ID 62 and the unique inmate user ID 56 include user identifying data such as, for example, a unique ID and/or password, and may also include user contact information such as, for example, a phone number, an e-mail, and/or a mobile device data associated with the mobile computing device 20 associated with the civilian profile 50/54. In addition, the unique civilian user ID 64 may include user contact information associated with the device 14, such as, for example a computer or a tablet. For example, the mobile device data may include, but is not limited to, the unique mobile device ID 64, operating system, phone number, IP address, mobile device API, and/or any suitable information that enables the system 10 to communicate with the corresponding mobile computing device 20. The verification ID

146 may include identifying data to help verify the identity of the user logging into the user profile 50/52/54 such as, for example, phone number, Caller ID Name, social media log-in information, photo, e-mail address, payment information, biometric information, and/or barcode. The verification ID 146 may be verified via CNAM, RPA, live photo, reverse e-mail, algorithm that check incoming and outgoing messages, information from e-mail headers, payment information, biometric scan, MRZ scanner, and/or video identification.

In one embodiment, the database 10 includes the action event record list 66 (shown in FIG. 32) that includes a plurality of action event records 68. Each action event record 68 may include the triggering event 70, action event data 72, and action event 74. The system 10 may initiate the action event 74 once the action event 74 is triggered by the triggering event 70. By the action event 74 being triggered by the triggering event 70, the action event 74 may then send the action event 74 to the corresponding server, dependent on which action event 74 has been triggered. Action event data 72 includes information and data including, but is not limited to, determining when the message 80 is received from a user, determining whether the message 80 includes a verification ID 146, holding onto the message 80 awaiting verification of the received verification ID 146, verifying the identity of the user associated with the user profile 50/52/54 via the verification ID 146, allowing a communication with the verified user 50/52/54, and sending the verified user 50/52/54 to the appropriate list 122 for future messaging. As shown in FIG. 32, the action event data 72 description may include data associated with the corresponding action record. For example, in one embodiment, the action event data 72, Action029, includes information that enables the system 10 to receive the verification ID 146 that matches the current user profile 52/54 verification ID 146, where the received verification ID 146 is compared to the current user profiles 52/54 to determine whether the received verification ID 146 matches the current user profile 52/54. The triggering event data includes data associated with the triggering event 70 that includes an event or occurrence that may be detected by the system 10. The triggering events 70 may include, but are not limited to, requests and/or signals received by the user computing device 14, for example, receiving the message 80, waiting for a determination of the verification ID 146, receive the message 80 that includes the verification ID 146, receive the verification ID 146 that matches the current user profile 52/54 verification ID 146, receive the verification ID 146 that does not match the current user profile 50, receive the new verification ID 146, receive the verified user profile 50/52/54, and send the message 80 to the user profile 50/52/54 where the identity of the user hasn't been verified. Once the system 10 initiates the triggering event 70, the triggering event 70 triggers the corresponding action event 74, which will send the action event data 72 to the corresponding server.

Figure 33:

The database 44 may also include the user action record list 76 (shown in FIG. 33) that includes a plurality of user action records 78 that are associated with a plurality of users. Each user action record 78 includes the user record 48 associated with the corresponding user ID 56/62, the action record ID 68, the triggering event 70, and the action event data 72. In addition, the user action record 78 may also include messaging information having data and information to be sent with the mobile computing device 20 associated with the corresponding user profile 50/52/54 and/or API information associated with the corresponding mobile computing device 20. In one embodiment, the messaging information may also include contact information such as, for example, verification IDS such as, e-mails, text, and phone numbers. The application server 38 may identify one or more additional user profiles that may receive notifications generated by the website hosting server 34 and includes contact information associated with the identified additional user profiles in the messaging information that has sent or received the message 80 using the system 10.

In one embodiment, the application server 38 is configured to receive the message 80 from the user including the verification ID 146. The application server 38 receives the verification ID 146, which corresponds with the message 80 received from the user. The verification ID 146 may be, but is not limited to, an e-mail address, a photo, a name and phone number, and/or a username from a third party website. The application server 38 may then hold the message 80 until the identity of the user associated with the user profile 50/52/54 which sent the message 80 has been verified. The identity of the user is verified based upon the verification ID 146. The verification ID 146 received must match the verification ID 146 stored in the database 44 associated with the user profile 50/52/54. If the verification ID 146 received does not match the current user profile 52/54, the system 10 may create the new user profile 50, as described above. The identity of the new user associated with the new user profile 50 may be verified via, but is not limited to, CNAM, RPA, video verification, and/or e-mail address. Once the identity of the new user or the current user is verified, the system 10 may allow communication between the verified user and the inmate user associated with the verified user profile 50/54. For the duration of the communication, the verified user 50/54 may be sent to the appropriate list 122 for future messaging.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor".

In some embodiments, the database 44, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBXX, Microsoft® SQL Server, Sybase®, and PostgreSQL. However, any database 44 may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The present invention has been described in an illustrative manner. The above description of illustrated examples of the present invention, including what is described in the Abstract, are not intended to be exhaustive or to be limitation to the precise forms disclosed. While specific embodiments of, and examples for, the present invention are described herein for illustrative purposes, various equivalent modifications are possible without departing from the broader spirit and scope of the present invention.

What is claimed is:

1. A system for verifying the identity of users associated with user profiles for messaging between civilian profiles and inmate profiles, the system comprising:
    a database including a plurality of user records, wherein the user records include a plurality of user profiles and each of the user profiles includes a verification ID, and an action event record list having a plurality of action event records, wherein each action event record includes a triggering event, action event data, and action event;
    an application server including a processor programmed with an algorithm to execute steps to:
        detect the triggering event from the user profile, wherein the triggering event comprises receiving a message from a user associated with a user profile, the message including the verification ID;
        trigger the action event to be performed by the application server or external server based on the triggering event;
        perform the action event data based on the action event comprising holding the message for verification of the identity of the user associated with the user profile;
        verify the identity of the user associated with the user profile via the verification ID;
        allow a communication with the verified user profile; and
        send the verified user profile to an appropriate list for future messaging.

2. The system as set forth in claim 1, wherein application server is further programmed to match the verification ID to a current user profile.

3. The system as set forth in claim 1, wherein the application server is further programmed to send a request to the user before receiving the message from the user associated with the user profile.

4. The system as set forth in claim 3, wherein the verification ID is received via caller ID name (CNAM).

5. The system as set forth in claim 1, wherein the verification ID is received via phone append (RPA).

6. The system as set forth in claim 1, wherein the verification ID is received via a live photo.

7. The system as set forth in claim 6, wherein the live photo is a current photo taken of the user.

8. The system as set forth in claim 6, wherein the live photo is a current photo taken of a government ID.

9. The system as set forth in claim 6, wherein the live photo is of a still photo of a recorded video.

10. The system as set forth in claim 1, wherein the verification ID is received via a barcode.

11. A method for verifying the identity of users associated with user profiles for messaging between civilian profiles and inmate profiles, said method comprising the steps of:
    accessing, by an application server, a database including a plurality of user records, wherein the user records include a plurality of user profiles and each of the user profiles includes a verification ID, and an action event record list having a plurality of action event records, wherein each action event record includes a triggering event, action event data, and action event;
    detecting the triggering event, by an application server, from the user profile, wherein the triggering event comprises receiving a message from a user associated with a user profile, the message including the verification ID;
    triggering, by the application server, the action event to be performed by the application server or external server based on the triggering event;
    performing, by the application server or the external server, the action event data based on the action event comprising holding, by the application server, the message for verification of the identity of the user associated with the user profile;
    verifying, by the application server, the identity of the user associated with the user profile via the verification ID;
    allowing, by the application server, a communication with the verified user profile; and
    sending, by the application server, the verified user profile to an appropriate list for future messaging.

12. The method as set forth in claim 11, wherein the method further comprises the step of matching the verification ID to a current user profile.

13. The method as set forth in claim 11, wherein the method further comprises the step of sending a request to the user before receiving the message from the user associated with the user profile.

14. The method as set forth in claim 13, wherein the verification ID is received via caller ID name (CNAM).

15. The method as set forth in claim 11, wherein the verification ID is received via phone append (RPA).

16. The method as set forth in claim 11, wherein the verification ID is received via a live photo.

17. The method as set forth in claim 16, wherein the live photo is a current photo taken of the user.

18. The method as set forth in claim 16, wherein the live photo is a current photo taken of a government ID.

19. The method as set forth in claim 11, wherein the live photo is of a still photo of a recorded video.

20. The method as set forth in claim 11, wherein the verification ID is received via a barcode.

21. One or more non-transitory computer-readable storage media, having computer executable instructions embodied thereon, where when executed by at least one processor, the computer-executable instructions cause the processor to:
- access a database including a plurality of user records, wherein the user records include a plurality of user profiles and each of the user profiles includes a verification ID, and an action event record list having a plurality of action event records, wherein each action event record includes a triggering event, action event data, and action event;
- detect the triggering event from the user profile, wherein the triggering event comprises receiving a message from a user associated with a user profile, the message including the verification ID;
- trigger the action event to be performed by the application server or external server based on the triggering event;
- perform the action event data based on the action event comprising holding the message for verification of the identity of the user associated with the user profile;
- verify the identity of the user associated with the user profile via the verification ID;
- allow a communication with the verified user profile; and
- send the verified user profile to an appropriate list for future messaging.

* * * * *